United States Patent
Watfa et al.

(10) Patent No.: US 9,648,447 B2
(45) Date of Patent: May 9, 2017

(54) SYSTEM LEVEL PROCEDURES AND METHODS TO ENABLE DATA SHARING IN CELLULAR NETWORK

(71) Applicant: INTERDIGITAL PATENT HOLDINGS, INC., Wilmington, DE (US)

(72) Inventors: Mahmoud Watfa, Saint Leonard (CA); Peter S. Wang, East Setauket, NY (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 571 days.

(21) Appl. No.: 13/891,586

(22) Filed: May 10, 2013

(65) Prior Publication Data

US 2013/0303088 A1    Nov. 14, 2013

Related U.S. Application Data

(60) Provisional application No. 61/645,437, filed on May 10, 2012, provisional application No. 61/682,910, filed on Aug. 14, 2012.

(51) Int. Cl.
*H04B 7/00* (2006.01)
*H04W 4/00* (2009.01)
(Continued)

(52) U.S. Cl.
CPC ............. *H04W 4/008* (2013.01); *H04W 4/00* (2013.01); *H04W 76/023* (2013.01);
(Continued)

(58) Field of Classification Search
None
See application file for complete search history.

(56) References Cited

U.S. PATENT DOCUMENTS 8,155,053 B2 * 4/2012 Wang .................... H04L 1/1867
370/328
8,243,725 B2 * 8/2012 Aghili ............... H04W 36/0022
370/225
(Continued)

FOREIGN PATENT DOCUMENTS

WO        2010/028690       3/2010
WO     WO 2010/028690   *  3/2010  ............. H04L 29/12
(Continued)

OTHER PUBLICATIONS

Alcatel-Lucent, "FS_ProSe: ProSe Control Paths," 3GPP TSG-SA WG1 #58, S1-121087, Seville, Spain (May 7-11, 2012).
(Continued)

*Primary Examiner* — Tuan A Tran
(74) *Attorney, Agent, or Firm* — Volpe and Koenig, P.C.

(57) ABSTRACT

Methods and systems may enable the setup and configuration of proximity services between wireless transmit/receive units (WTRUs) over different sharing paths including via a direct air interface, a radio access network (RAN) or one or more network nodes. Mobility management entities (MMEs) may exchange messages to initiate, modify or terminate a proximity service session between WTRUs, and may negotiate data paths for proximity services with or without the assistance of WTRUs. WTRU-to-WTRU control plane messages may be exchanged between WTRUs with limited involvement from other network entities and may avoid the setup of resources for data plane communications. Mobility management entities (MMEs) may exchange messages to initiate, modify or terminate a proximity service session between WTRUs, and may negotiate data paths for proximity services with or without the assistance of WTRUs.

21 Claims, 12 Drawing Sheets

(51) Int. Cl.
  *H04W 76/02*  (2009.01)
  *H04W 4/02*  (2009.01)
  *H04W 84/08*  (2009.01)
(52) U.S. Cl.
  CPC .............. *H04W 4/001* (2013.01); *H04W 4/02* (2013.01); *H04W 4/023* (2013.01); *H04W 84/08* (2013.01)

(56) References Cited

U.S. PATENT DOCUMENTS

| | | | | |
|---|---|---|---|---|
| 8,532,614 | B2* | 9/2013 | Somasundaram | H04W 12/02 370/328 |
| 8,599,791 | B2* | 12/2013 | Mukherjee | H04W 36/0022 370/328 |
| 8,705,461 | B2* | 4/2014 | Bala | H04L 5/0007 370/329 |
| 8,903,376 | B2* | 12/2014 | Watfa | H04W 76/027 370/331 |
| 9,001,655 | B2* | 4/2015 | Watfa | H04W 48/06 370/235 |
| 2003/0078047 | A1 | 4/2003 | Lee et al. | |
| 2004/0165587 | A1 | 8/2004 | Kiyoto et al. | |
| 2006/0268816 | A1 | 11/2006 | Adachi et al. | |
| 2010/0210238 | A1 | 8/2010 | Cho et al. | |
| 2011/0294474 | A1 | 12/2011 | Barany et al. | |
| 2012/0002637 | A1* | 1/2012 | Adjakple | H04W 36/0055 370/331 |

FOREIGN PATENT DOCUMENTS

| | | |
|---|---|---|
| WO | 2011/119680 | 9/2011 |
| WO | 2013/163595 | 10/2013 |

OTHER PUBLICATIONS

General Dynamics Broadband UK, "Clarification in discussion of control paths for ProSe Communications in section 4.2," 3GPP TSG-SA WG1 ad-hoc on GCSE_LTE and ProSe, S1-130172, Prague, Czech Republic (Jan. 23-25, 2013).
LG Electronics, "Solution for selecting a direct communication path when multiple paths are available," SA WG2 Meeting #96, S2-131138, San Diego, California, USA (Apr. 8-12, 2013).
Renesas Mobile Europe Ltd., "Solution for ProSe Communications using EUTRA," SA WG2 Meeting #96, S2-131195, San Diego, California, USA (Apr. 8-12, 2013).
Third Generation Partnership Project, "Technical Specification Group Services and System Aspects; Feasibility study for Proximity Services (ProSe) (Release 12)," 3GPP TR 22.803 V12.1.0 (Mar. 2013).
Third Generation Partnership Project, "Technical Specification Group SA; Feasibility Study for Proximity Services (ProSe) (Release 12)," 3GPP TR 22.803 V0.2.0 (Feb. 2012).
Third Generation Partnership Project, "Technical Specification Group Services and System Aspects; General Packet Radio Service (GPRS) enhancements for Evolved Universal Terrestrial Radio Access Network (E-UTRAN) access (Release 8)," 3GPP TS 23.401 V8.16.0 (Mar. 2012).
Third Generation Partnership Project, "Technical Specification Group Services and System Aspects; General Packet Radio Service (GPRS) enhancements for Evolved Universal Terrestrial Radio Access Network (E-UTRAN) access (Release 9)," 3GPP TS 23.401 V9.12.0 (Mar. 2012).
Third Generation Partnership Project, "Technical Specification Group Services and System Aspects; General Packet Radio Service (GPRS) enhancements for Evolved Universal Terrestrial Radio Access Network (E-UTRAN) access (Release 10)," 3GPP TS 23.401 V10.7.0 (Mar. 2012).
Third Generation Partnership Project, "Technical Specification Group Services and System Aspects; General Packet Radio Service (GPRS) enhancements for Evolved Universal Terrestrial Radio Access Network (E-UTRAN) access (Release 8)," 3GPP TS 23.401 V8.18.0 (Mar. 2013).
Third Generation Partnership Project, "Technical Specification Group Services and System Aspects; General Packet Radio Service (GPRS) enhancements for Evolved Universal Terrestrial Radio Access Network (E-UTRAN) access (Release 9)," 3GPP TS 23.401 V9.15.0 (Mar. 2013).
Third Generation Partnership Project, "Technical Specification Group Services and System Aspects; General Packet Radio Service (GPRS) enhancements for Evolved Universal Terrestrial Radio Access Network (E-UTRAN) access (Release 10)," 3GPP TS 23.401 V10.10.0 (Mar. 2013).
Third Generation Partnership Project, "Technical Specification Group Services and System Aspects; General Packet Radio Service (GPRS) enhancements for Evolved Universal Terrestrial Radio Access Network (E-UTRAN) access (Release 11)," 3GPP TS 23.401 V11.5.0 (Mar. 2013).
Third Generation Partnership Project, "Technical Specification Group Services and System Aspects; General Packet Radio Service (GPRS) enhancements for Evolved Universal Terrestrial Radio Access Network (E-UTRAN) access (Release 12)," 3GPP TS 23.401 V12.0.0 (Mar. 2013).
Third Generation Partnership Project, "Technical Specification Group Services and System Aspects; General Packet Radio Service (GPRS) enhancements for Evolved Universal Terrestrial Radio Access Network (E-UTRAN) access (Release 11)," 3GPP TS 23.401 V11.1.0 (Mar. 2012).
Third Generation Partnership Project, "Technical Specification Group Core Network and Terminals; 3GPP Evolved Packet System (EPS); Evolved General Packet Radio Service (GPRS) Tunnelling Protocol for Control plane (GTPv2-C); Stage 3 (Release 8)," 3GPP TS 29.274 V8.11.0 (Dec. 2011).
Third Generation Partnership Project, "Technical Specification Group Core Network and Terminals; 3GPP Evolved Packet System (EPS); Evolved General Packet Radio Service (GPRS) Tunnelling Protocol for Control plane (GTPv2-C); Stage 3 (Release 9)," 3GPP TS 29.274 V9.10.0 (Mar. 2012).
Third Generation Partnership Project, "Technical Specification Group Radio Access Network; Evolved Universal Terrestrial Radio Access Network (E-UTRAN); S1 Application Protocol (S1AP) (Release 8)," 3GPP TS 36.413 V8.10.0 (Jun. 2010).
Third Generation Partnership Project, "Technical Specification Group Radio Access Network; Evolved Universal Terrestrial Radio Access Network (E-UTRAN); S1 Application Protocol (S1AP) (Release 9)," 3GPP TS 36.413 V9.8.0 (Dec. 2011).
Third Generation Partnership Project, "Technical Specification Group Radio Access Network; Evolved Universal Terrestrial Radio Access Network (E-UTRAN); S1 Application Protocol (S1AP) (Release 10)," 3GPP TS 36.413 V10.5.0 (Mar. 2012).
Third Generation Partnership Project, "Technical Specification Group Radio Access Network; Evolved Universal Terrestrial Radio Access Network (E-UTRAN); S1 Application Protocol (S1AP) (Release 10)," 3GPP TS 36.413 V10.6.0 (Jun. 2012).
Third Generation Partnership Project, "Technical Specification Group Radio Access Network; Evolved Universal Terrestrial Radio Access Network (E-UTRAN); S1 Application Protocol (S1AP) (Release 11)," 3GPP TS 36.413 V11.3.0 (Mar. 2013).
Third Generation Partnership Project, "Technical Specification Group Core Network and Terminals; General Packet Radio Service (GPRS); GPRS Tunnelling Protocol (GTP) across the Gn and Gp interface (Release 9)," 3GPP TS 29.060 V9.12.0 (Mar. 2013).
Third Generation Partnership Project, "Technical Specification Group Core Network and Terminals; General Packet Radio Service (GPRS); GPRS Tunnelling Protocol (GTP) across the Gn and Gp interface (Release 10)," 3GPP TS 29.060 V10.5.0 (Mar. 2012).
Third Generation Partnership Project, "Technical Specification Group Core Network and Terminals; General Packet Radio Service (GPRS); GPRS Tunnelling Protocol (GTP) across the Gn and Gp interface (Release 12)," 3GPP TS 29.060 V12.0.0 (Mar. 2013).
Third Generation Partnership Project, "Technical Specification Group Core Network and Terminals; General Packet Radio Service

(56) References Cited

OTHER PUBLICATIONS (GPRS); GPRS Tunnelling Protocol (GTP) across the Gn and Gp interface (Release 11)," 3GPP TS 29.060 V11.6.0 (Mar. 2013).
Third Generation Partnership Project, "Technical Specification Group Core Network and Terminals; General Packet Radio Service (GPRS); GPRS Tunnelling Protocol (GTP) across the Gn and Gp interface (Release 11)," 3GPP TS 29.060 V11.2.0 (Mar. 2012).
Third Generation Partnership Project, "Technical Specification Group Core Network and Terminals; General Packet Radio Service (GPRS); GPRS Tunnelling Protocol (GTP) across the Gn and Gp interface (Release 7)," 3GPP TS 29.060 V7.17.0 (Sep. 2011).
Third Generation Partnership Project, "Technical Specification Group Core Network and Terminals; General Packet Radio Service (GPRS); GPRS Tunnelling Protocol (GTP) across the Gn and Gp interface (Release 8)," 3GPP TS 29.060 V8.15.0 (Sep. 2011).
Third Generation Partnership Project, "Technical Specification Group Core Network and Terminals; General Packet Radio Service (GPRS); GPRS Tunnelling Protocol (GTP) across the Gn and Gp interface (Release 8)," 3GPP TS 29.060 V8.16.0 (Jun. 2012).
Third Generation Partnership Project, "Technical Specification Group Core Network and Terminals; General Packet Radio Service (GPRS); GPRS Tunnelling Protocol (GTP) across the Gn and Gp interface (Release 9)," 3GPP TS 29.060 V9.10.0 (Mar. 2012).
Third Generation Partnership Project, "Technical Specification Group Core Network and Terminals; General Packet Radio Service (GPRS); GPRS Tunnelling Protocol (GTP) across the Gn and Gp interface (Release 10)," 3GPP TS 29.060 V10.8.0 (Mar. 2013).
Third Generation Partnership Project, "Technical Specification Group Core Network and Terminals; 3GPP Evolved Packet System (EPS); Evolved General Packet Radio Service (GPRS) Tunnelling Protocol for Control plane (GTPv2-C); Stage 3 (Release 12)," 3GPP TS 29.274 V12.0.0 (Mar. 2013).
Third Generation Partnership Project, "Technical Specification Group Core Network and Terminals; 3GPP Evolved Packet System (EPS); Evolved General Packet Radio Service (GPRS) Tunnelling Protocol for Control plane (GTPv2-C); Stage 3 (Release 11)," 3GPP TS 29.274 V11.2.0 (Mar. 2012).
Third Generation Partnership Project, "Technical Specification Group Core Network and Terminals; 3GPP Evolved Packet System (EPS); Evolved General Packet Radio Service (GPRS) Tunnelling Protocol for Control plane (GTPv2-C); Stage 3 (Release 11)," 3GPP TS 29.274 V11.6.0 (Mar. 2013).
Third Generation Partnership Project, "Technical Specification Group Core Network and Terminals; 3GPP Evolved Packet System (EPS); Evolved General Packet Radio Service (GPRS) Tunnelling Protocol for Control plane (GTPv2-C); Stage 3 (Release 10)," 3GPP TS 29.274 V10.10.0 (Mar. 2012).
Third Generation Partnership Project, "Technical Specification Group Core Network and Terminals; 3GPP Evolved Packet System (EPS); Evolved General Packet Radio Service (GPRS) Tunnelling Protocol for Control plane (GTPv2-C); Stage 3 (Release 10)," 3GPP TS 29.274 V10.6.0 (Mar. 2012).
Third Generation Partnership Project, "Technical Specification Group Core Network and Terminals; 3GPP Evolved Packet System (EPS); Evolved General Packet Radio Service (GPRS) Tunnelling Protocol for Control plane (GTPv2-C); Stage 3(Release 9)," 3GPP TS 29.274 V9.11.0 (Dec. 2012).
TSG SA WG1, "WID on Proposal for a study on Proximity-based Services," 3GPP TSG SA Plenary Meeting #53, SP-110638, Fukuoka, Japan (Sep. 19-21, 2011).
ZTE, "Solution for ProSe discovery and communication," SA WG2 Meeting #96, S2-130979, San Diego, USA (Apr. 8-12, 2013).
IEEE Standard for Local and metropolitan area networks; Part 16: Air Interface for Broadband Wireless Access Systems, IEEE Std. 80216™-2009 (May 29, 2009).
IEEE Standard for Air Interface for Broadband Wireless Access Systems—Amendment 2: Higher Reliability Networks, IEEE Std 802.16n™-2013 (Mar. 3, 2013).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.12.0 (Mar. 2010).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.9.0 (Dec. 2011).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.10.0 (Dec. 2012).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.7.0 (Mar. 2012).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.9.0 (Dec. 2012).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 11)," 3GPP TS 36.300 V11.1.0 (Mar. 2012).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 11)," 3GPP TS 36.300 V11.5.0 (Mar. 2013).
Third Generation Partnership Project, "Technical Specification Group Radio Access Network; Evolved Universal Terrestrial Radio Access (E-UTRA); Physical layer procedures (Release 8)," 3GPP TS 36.213 V8.8.0 (Sep. 2009).
Third Generation Partnership Project, "Technical Specification Group Radio Access Network; Evolved Universal Terrestrial Radio Access (E-UTRA); Physical layer procedures (Release 9)," 3GPP TS 36.213 V9.3.0 (Sep. 2010).
Third Generation Partnership Project, "Technical Specification Group Radio Access Network; Evolved Universal Terrestrial Radio Access (E-UTRA); Physical layer procedures (Release 10)," 3GPP TS 36.213 V10.5.0 (Mar. 2012).
Third Generation Partnership Project, "Technical Specification Group Radio Access Network; Evolved Universal Terrestrial Radio Access (E-UTRA); Physical layer procedures (Release 10)," 3GPP TS 36.213 V10.9.0 (Feb. 2013).
Third Generation Partnership Project, "Technical Specification Group Radio Access Network; Evolved Universal Terrestrial Radio Access (E-UTRA); Physical layer procedures (Release 11)," 3GPP TS 36.213 V11.2.0 (Feb. 2013).
Third Generation Partnership Project, "Technical Specification Group Radio Access Network; Evolved Universal Terrestrial Radio Access (E-UTRA); Multiplexing and channel coding (Release 8)," 3GPP TS 36.212 V8.8.0 (Dec. 2009).
Third Generation Partnership Project, "Technical Specification Group Radio Access Network; Evolved Universal Terrestrial Radio Access (E-UTRA); Multiplexing and channel coding (Release 9)," 3GPP TS 36.212 V9.4.0 (Sep. 2011).
Third Generation Partnership Project, "Technical Specification Group Radio Access Network; Evolved Universal Terrestrial Radio Access (E-UTRA); Multiplexing and channel coding (Release 10)," 3GPP TS 36.212 V10.5.0 (Mar. 2012).
Third Generation Partnership Project, "Technical Specification Group Radio Access Network; Evolved Universal Terrestrial Radio Access (E-UTRA); Multiplexing and channel coding (Release 10)," 3GPP TS 36.212 V10.7.0 (Dec. 2012).
Third Generation Partnership Project, "Technical Specification Group Radio Access Network; Evolved Universal Terrestrial Radio Access (E-UTRA); Multiplexing and channel coding (Release 11)," 3GPP TS 36.212 V11.2.0 (Feb. 2013).

(56) References Cited

OTHER PUBLICATIONS

Third Generation Partnership Project, "Technical Specification Group Radio Access Network; Evolved Universal Terrestrial Radio Access (E-UTRA); Medium Access Control (MAC) protocol specification (Release 8)," 3GPP TS 36.321 V8.12.0 (Mar. 2012).
Third Generation Partnership Project, "Technical Specification Group Radio Access Network; Evolved Universal Terrestrial Radio Access (E-UTRA); Medium Access Control (MAC) protocol specification (Release 9)," 3GPP TS 36.321 V9.6.0 (Mar. 2012).
Third Generation Partnership Project, "Technical Specification Group Radio Access Network; Evolved Universal Terrestrial Radio Access (E-UTRA); Medium Access Control (MAC) protocol specification (Release 10)," 3GPP TS 36.321 V10.5.0 (Mar. 2012).
Third Generation Partnership Project, "Technical Specification Group Radio Access Network; Evolved Universal Terrestrial Radio Access (E-UTRA); Medium Access Control (MAC) protocol specification (Release 10)," 3GPP TS 36.321 V10.8.0 (Mar. 2013).
Third Generation Partnership Project, "Technical Specification Group Radio Access Network; Evolved Universal Terrestrial Radio Access (E-UTRA); Medium Access Control (MAC) protocol specification (Release 11)," 3GPP TS 36.321 V11.2.0 (Mar. 2013).
Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 V8.16.0 (Dec. 2011).
Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 V8.19.0 (Mar. 2013).
Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.10.0 (Mar. 2012).
Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.14.1 (Mar. 2013).
Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.5.0 (Mar. 2012).
Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.9.0 (Mar. 2013).
Third Generation Partnership Project, "Technical Specification Group Radio Access Network; Evolved Universal Terrestrial Radio Access (E-UTRA); Radio Resource Control (RRC); Protocol specification (Release 11)," 3GPP TS 36.331 V11.3.0 (Mar. 2013).

\* cited by examiner

900

| Message Type | 902 |
| Service Type | 904 |
| Session/ Application ID | 906 |
| Initiating WTRU Identity | 908 |
| Terminating WTRU Identity | 910 |
| Preferred Data Path | 912 |
| Global Cell ID | 914 |
| Message to Terminating WTRU | 916 |
| Other | 918 |

| Message Type | 902 |
| Service Type | 904 |
| Session/ Application ID | 906 |
| Result | 1002 |
| Initiating WTRU Identity | 908 |
| Terminating WTRU Identity | 910 |
| Preferred Data Path | 912 |
| Global Cell ID | 914 |
| Message for Initiating WTRU | 916 |
| Other | 918 |

FIG. 10

SYSTEM LEVEL PROCEDURES AND METHODS TO ENABLE DATA SHARING IN CELLULAR NETWORK

CROSS REFERENCE TO RELATED APPLICATIONS

This application claims the benefit of U.S. Provisional Application No. 61/645,437, filed May 10, 2012, and U.S. Provisional Application No. 61/682,910, filed Aug. 14, 2012, the contents of which are hereby incorporated by reference herein.

BACKGROUND

Proximity-based applications and services may be used to discover instances of applications running in wireless devices that are within proximity of each other, and exchange or share application-related data or other events. 3rd Generation Partnership Project (3GPP) technology and related standards may enable proximity-based discovery and communication between wireless devices, and promote a vast array proximity-based applications and services.

SUMMARY

Methods and systems may enable the setup and configuration of proximity services between wireless transmit/receive units (WTRUs) over different sharing paths including via a direct air interface, a radio access network (RAN) or one or more network nodes. Mobility management entities (MMEs) may exchange messages to initiate, modify or terminate a proximity service session between WTRUs, and may negotiate data paths for proximity services with or without the assistance of WTRUs. WTRU-to-WTRU control plane messages may be exchanged between WTRUs with limited involvement from other network entities and may avoid the setup of resources for data plane communications. Mobility management entities (MMEs) may exchange messages to initiate, modify or terminate a proximity service session between WTRUs, and may negotiate data paths for proximity services with or without the assistance of WTRUs.

BRIEF DESCRIPTION OF THE DRAWINGS

A more detailed understanding may be had from the following description, given by way of example in conjunction with the accompanying drawings wherein:

FIG. 9 shows an example of a proximity services message;

FIG. 10 shows an example Proximity Service Response message;

DETAILED DESCRIPTION

Figure 1A:
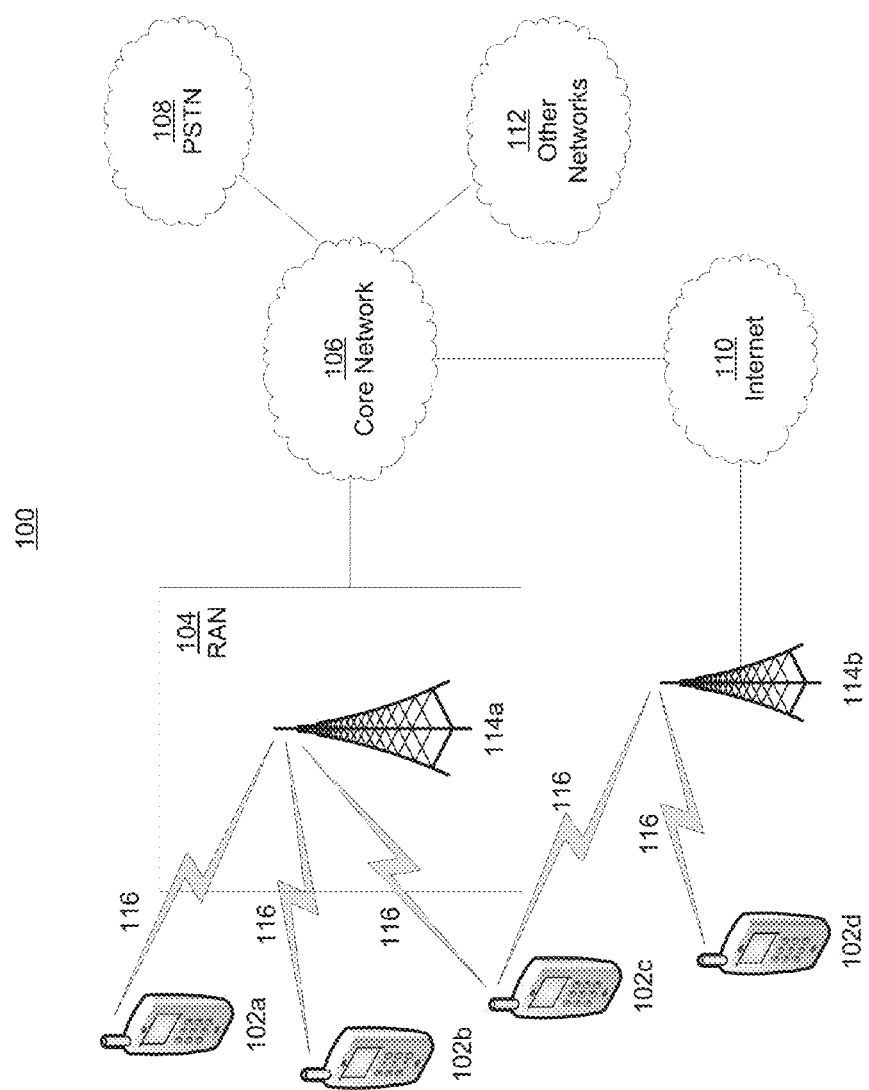
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
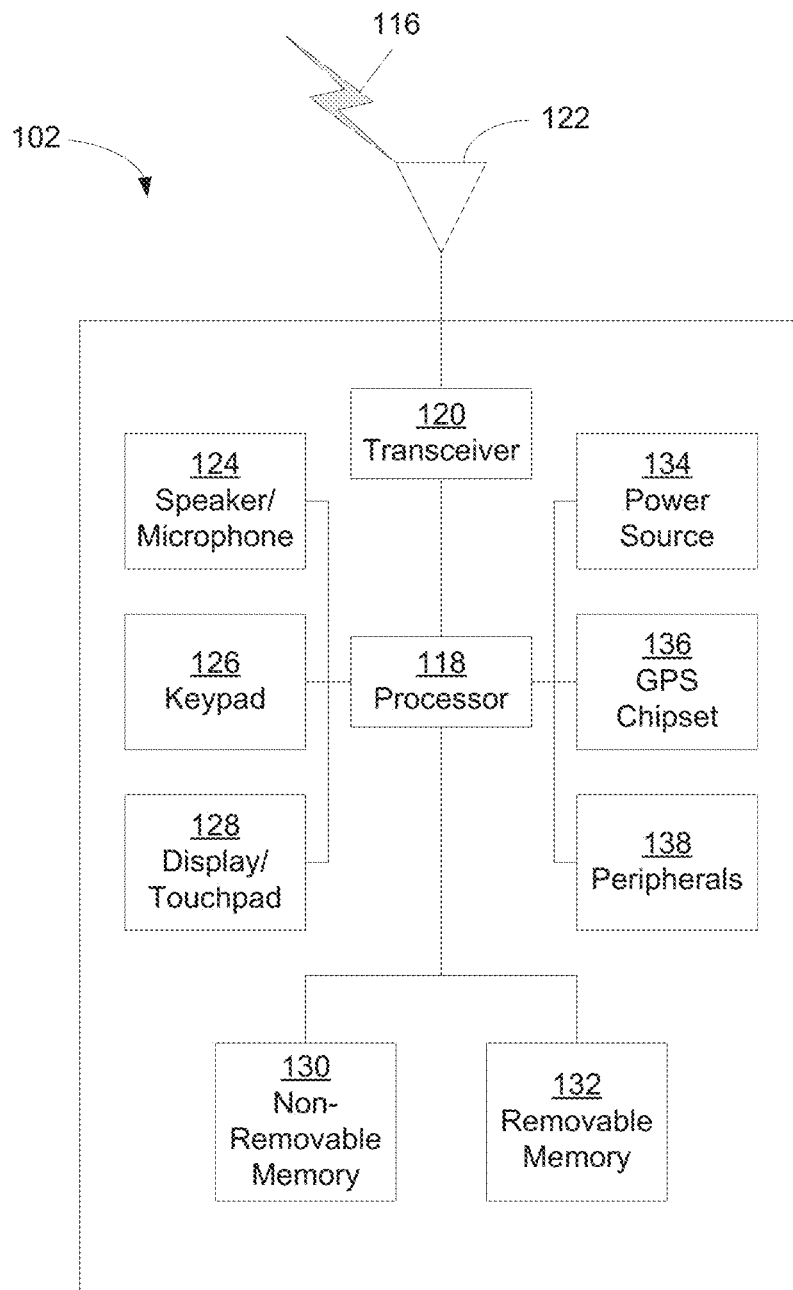
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
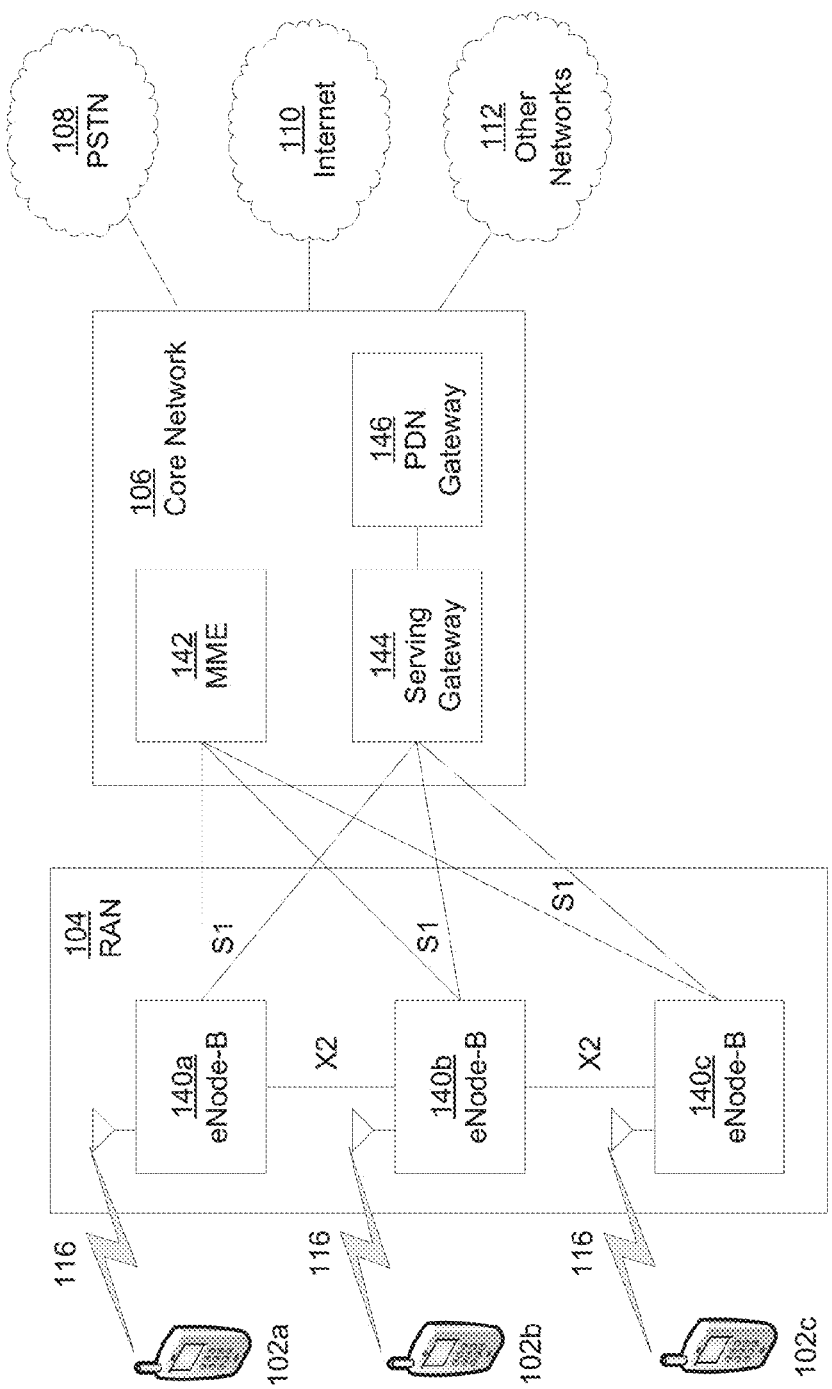
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management entity gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

3GPP proximity-based services may have any number of applications including, for example: commercial and/or social use; network offloading; public safety; integration of current infrastructure services to assure the consistency of the user experience including reachability and mobility aspects; public safety, for example, in case of absence of UTRAN coverage (which may be subject to regional regulation and operator policy, and limited to specific public-safety designated frequency bands and terminals). Actions for proximity-based services may include, for example: WTRU proximity discovery; WTRU consent to being discoverable, contactable or conversational; proximity WTRU-to-WTRU communications; controllability and policies for discovery by the network or operators; discoverability; and the forms of communication following discovery. Herein, proximity services and sharing or data sharing may be used interchangeably. Similarly, a field or an information element (IE) in a message may be used interchangeably. The terms source, originating, commanding, partner, proximity, or requesting entity may be used interchangeably when referring to entities involved in proximity services, including MMEs servers and WTRUs. Similarly, the terms target, terminating, partner, proximity, destination or ending entity (e.g. MME, server or WTRU) may be used interchangeably.

Figure 2:
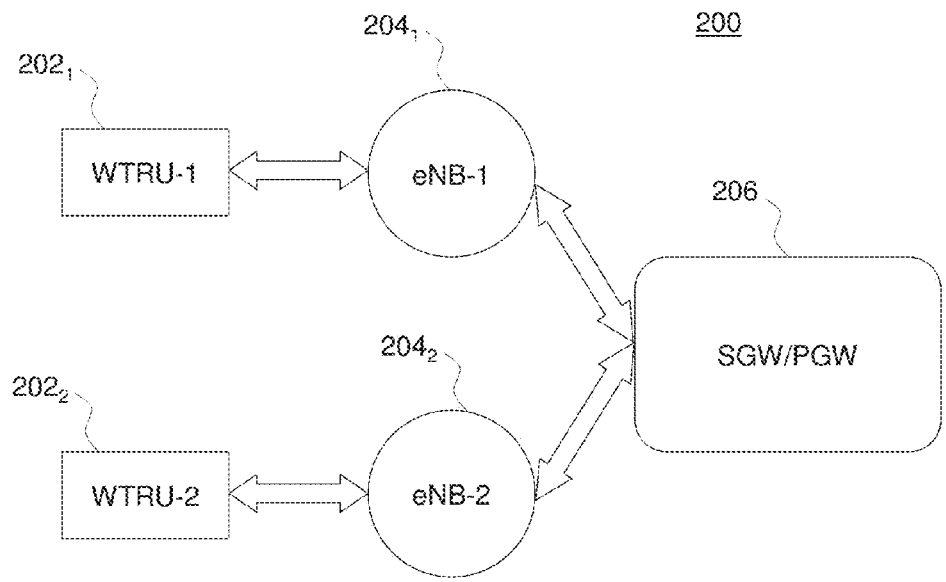
FIG. 2 shows an example communication network that enables communication between two WTRUs via a core network.

FIG. 2 shows an example communication network 200 that enables communication between two WTRUs, $202_{1,2}$ via a core network node 206. In this example, if two WTRUs $202_{1,2}$ happen to be close to each other, the communication between these WTRUs $202_{1,2}$ may go via respective eNBs $204_{1,2}$ and a core network (CN) node 206, which may be for example a serving gateway (SGW) or a packet data network gateway (PGW). Communications between proximity WTRUs may take other paths such as a direct radio path in licensed/unlicensed spectrum within certain distance, or an indirect through network elements, for example intra/inter-cell or intra/inter-eNB or S-GW, which may be controlled by the network or by operators. Examples of alternate communication paths between proximate WTRUs are shown in FIGS. 3 and 4.

Figure 3:
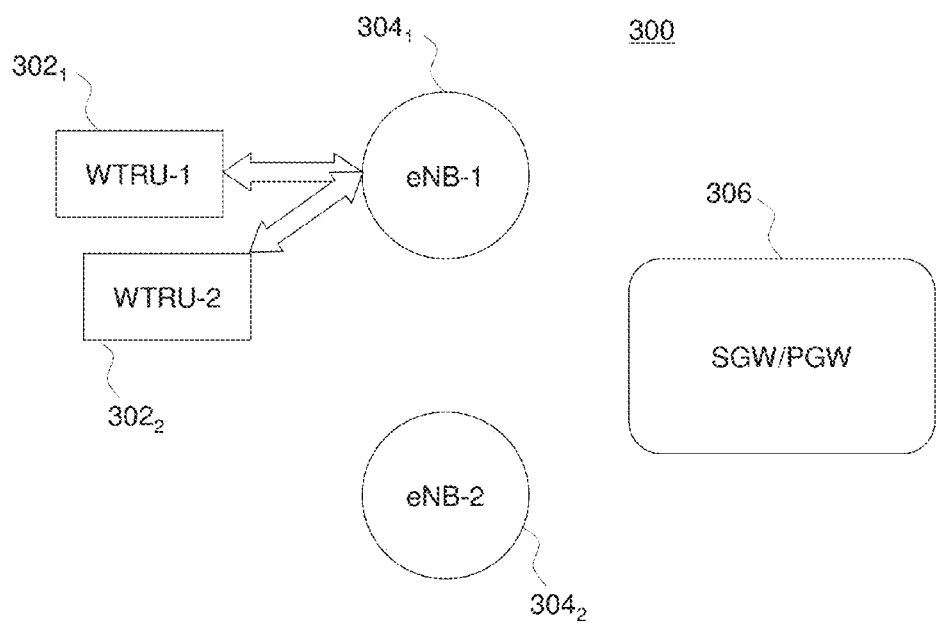
FIG. 3 shows an example communication network that enables communication between two WTRUs via a common eNB.
Figure 4:
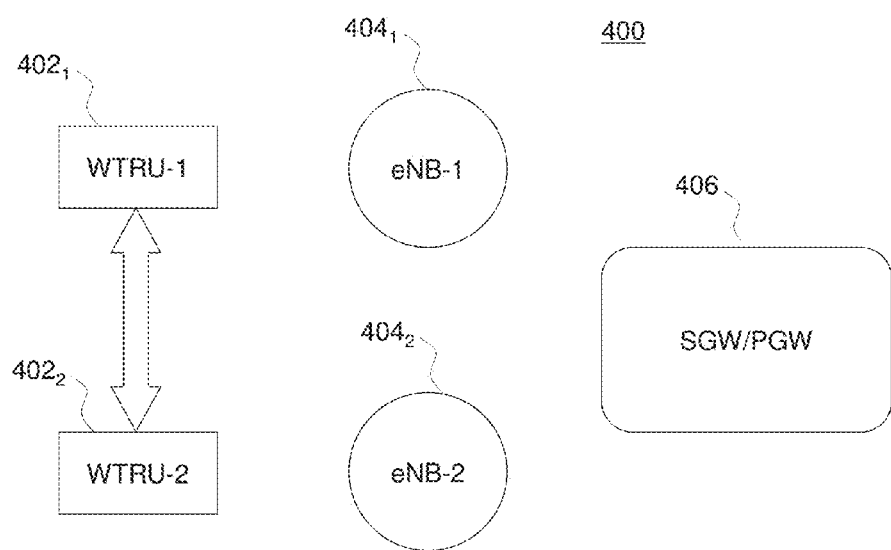
FIG. 4 shows an example communication network that enables direct communication between two WTRUs.

FIG. 3 shows an example communication network 300 that enables communication between two WTRUs, $302_{1,2}$, via a common eNB $304_1$. In this example, communication between the WTRUs $302_{1,2}$ may be locally routed through closest common eNB $304_1$, such that interaction with eNB $304_2$ and core network node 306 (e.g. SGW/PGW) may not be needed for WTRUs, $302_{1,2}$ to communicate. FIG. 4 shows an example communication network 400 that enables direct communication between two WTRUs $402_{1,2}$. In this example, WTRUs $402_{1,2}$ may communicate directly with one another over the air interface without the need to send information to eNBs $404_{1,2}$ or core network node 406 (e.g. SGW/PGW). The proximity service data path selection between direct or indirect over a certain path in the infrastructure may be determined by the radio or network coverage or load conditions or by policies set by the network or operators. Proximity-based services may be supported in network sharing deployments.

Certain 3GPP specifications may only partially address proximity-based service, because such traffic and signaling may be routed through the network, thus impacting performance and adding potentially unnecessary load in the network. Operators may be in (continuous) control of WTRU-to-WTRU communication. Network operators may need means to control the establishment of proximity communication sessions, modify an existing session, and/or terminate proximity services. For example, core network nodes may need to communicate with each other for the purpose of enabling proximity services. Proximity services may be useful in the following example scenarios.

Figure 5:
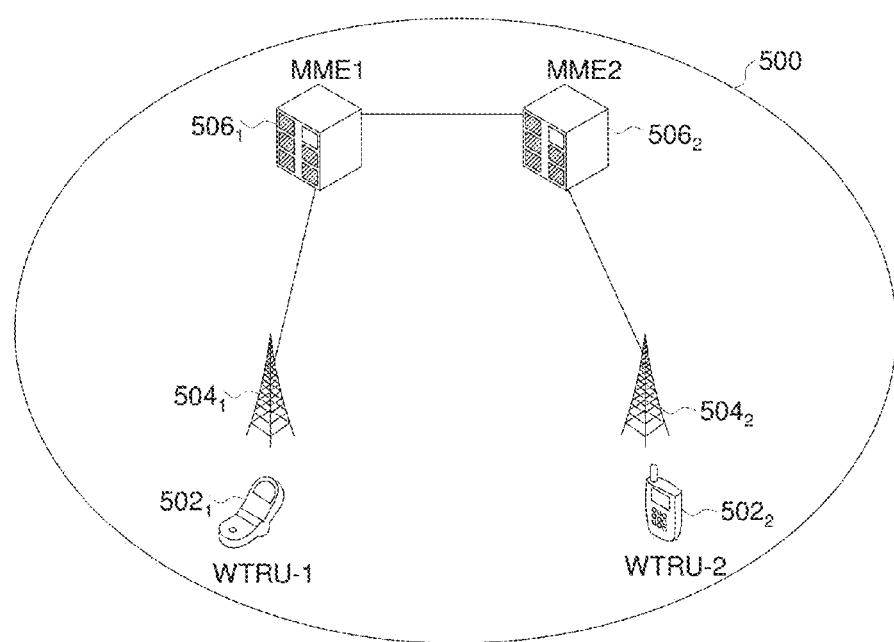
FIG. 5 shows an example communication network for proximity services for WTRUs belonging to different mobility management entity gateways (MMEs)

FIG. 5 shows an example communication network 500 for proximity services. In the example of FIG. 5, WTRUs $502_{1,2}$ may be served by different eNBs $504_{1,2}$ and MMEs $506_{1,2}$, respectively. WTRUs $502_{1,2}$ may be served by the same operator or by different operators. In this example, MME $506_1$ may attempt to control a proximity service for WTRU $502_1$ to enable it to communicate with WTRU $502_2$. MME $506_1$ may communicate with MME $506_2$ to inform it about the request and form a combined effort by the MMEs $506_{1,2}$ to permit and/or control the proximity service between the WTRUs $502_{1,2}$.

As discussed herein, the term proximity may or may not refer to WTRUs that are in close geographical proximity of each other. Rather, proximity applies generally herein to WTRUs that are allowed to communicate with each other under certain relationships regardless of the geographical distance between the WTRUs. For proximity services, the communication path between two WTRUs may be setup in the most efficient manner in view of the WTRUs' relative locations. The need to control proximity services between WTRUs may be independent of the actual communication path that may take place between them (for example, direct over the air, via the RAN, or via a common SGW).

Figure 6:
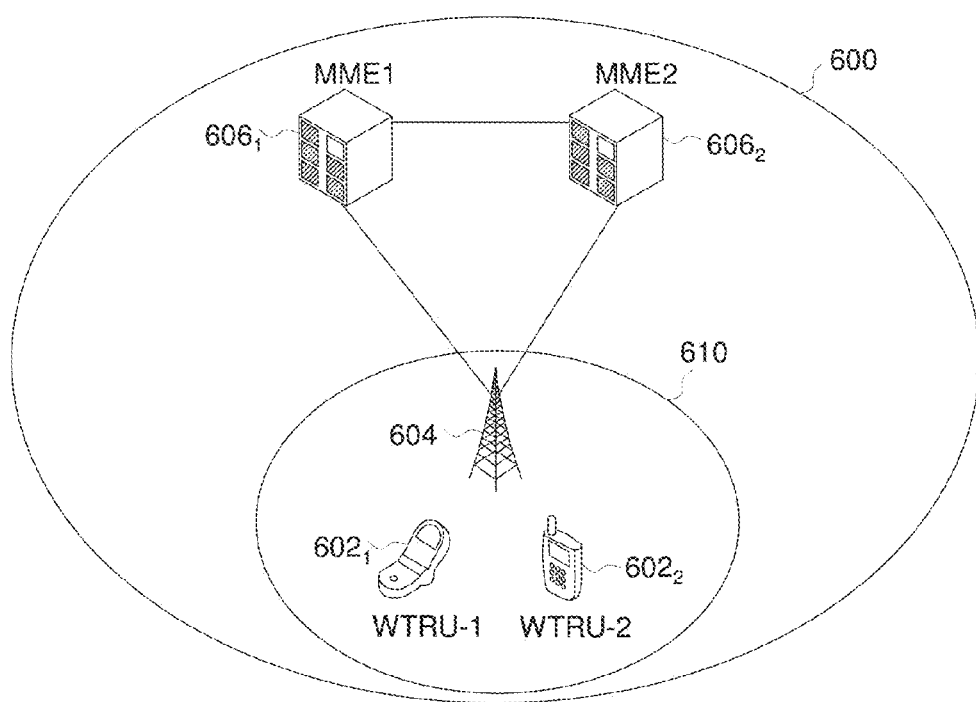
FIG. 6 shows an example communication network for proximity services for WTRUs controlled by different MMEs sharing a radio access network (RAN)

An MME may communicate with other MME node(s) to control a proximity service session. FIG. 6 shows another example communication network 600 for proximity services. In the example of FIG. 6, WTRUs $602_{1,2}$ may be served by the same eNB 604 in the same cell 610, but the eNB 604 may be shared by different the different operators. In this example, WTRUs $602_{1,2}$ may access different MMEs $606_{1,2}$. For WTRUs $602_{1,2}$ to communicate, their corresponding operators and/or MMEs $606_{1,2}$ may communicate with each other in order to control the establishment, operation and/or termination of the proximity service between WTRUs $602_{1,2}$.

In the examples of FIGS. 5 and 6, the control of proximity services may range from a basic indication from one MME to another about the request to have proximity service between two (or more) WTRUs, to more complex methods that may determine the best communication path that should be used between the WTRUs (e.g. direct communication over the radio interface, or communication via the eNBs, etc.). Moreover, the communication path may vary and the MMEs in question may adapt the paths to meet requests or requirements set by an operator or in response to certain events. For example, a change in WTRU subscription may change the communication path, or an occurrence of an emergency case may trigger a different communication path.

As part of mobile operators' coordination for proximity service provisioning, MMEs, which may belong to the same or different operators, may stay updated about the location or availability of WTRUs. For example, MMEs (from the same or different operators) may inform the WTRUs they are serving about availability/location of other WTRUs with which proximity services may be placed. Thus, when one MME learns about the availability/location of a WTRU, this MME may inform other MMEs about the availability/location of the WTRU in question. This information may be used by the recipient MMEs for the purpose of providing proximity services to the WTRUs that may desire such a service with the WTRU in question. To this end, a procedure between MMEs may enable MMEs to push or forward information about, for example, the availability and/or location of WTRUs to other cooperating MMEs that may be part of a joint proximity service provisioning, so they may enable corresponding WTRUs to engage in proximity services.

Procedures may enable MME-to-MME communication for the control of proximity services. An MME may push information to other MMEs or RAN nodes. Such information may include, but is not limited to, the availability, location or other aspect of WTRUs that are subscribed for proximity services. Inter-MME and other network scenarios, procedures and functionalities may be used to perform any of the following: establish a data sharing session and/or path; inquire, confirm, and/or notify of the proximity between WTRUs; and locate and/or identify the network node, possibly across different public land mobile networks (PLMNs) and/or operators, which may be the responsible contact point for the concerned WTRU(s).

In wireless communication networks such as UMTS and LTE, the control plane, which may also be referred to as the non-access stratum (NAS), may be functional layer in the protocol stacks between the core network and WTRUs. This layer may be used, for example, to manage the establishment of communication sessions and for maintaining continuous communications with the WTRU as it moves. The control plane (i.e. NAS) may contrast from the user plane or the access stratum, which may be responsible for carrying user data over the wireless portion of the network. In the case of proximity service, control plane communication may exist directly between WTRUs.

WTRUs may send messages to each other either directly, which may include over the air or via the RAN but without core network involvement, or via the core network, for example via the MME. Such communication may happen after the network allows the proximity service to take place. Control plane messages exchanged between WTRUs may serve several purposes and may act as a generic payload container that may carry proximity related data or any other control plane message. WTRU-to-WTRU control plane communication protocols and procedures are further described below.

For the WTRUs identified with each other in proximity or other relationships, a set of WTRU-to-WTRU control plane protocol messages and procedures may be used such that the WTRUs involved may engage in peer-to-peer communication. For peer-to-peer, the WTRU may directly address the other WTRU for direct command and/or data exchange and sharing purposes. WTRU-to-WTRU control protocol signals and/or messages may also be transport layer primitives to be used by WTRU upper layer protocol entities as well as WTRU applications, even if such applications or entities are not related to proximity services.

Figure 7:
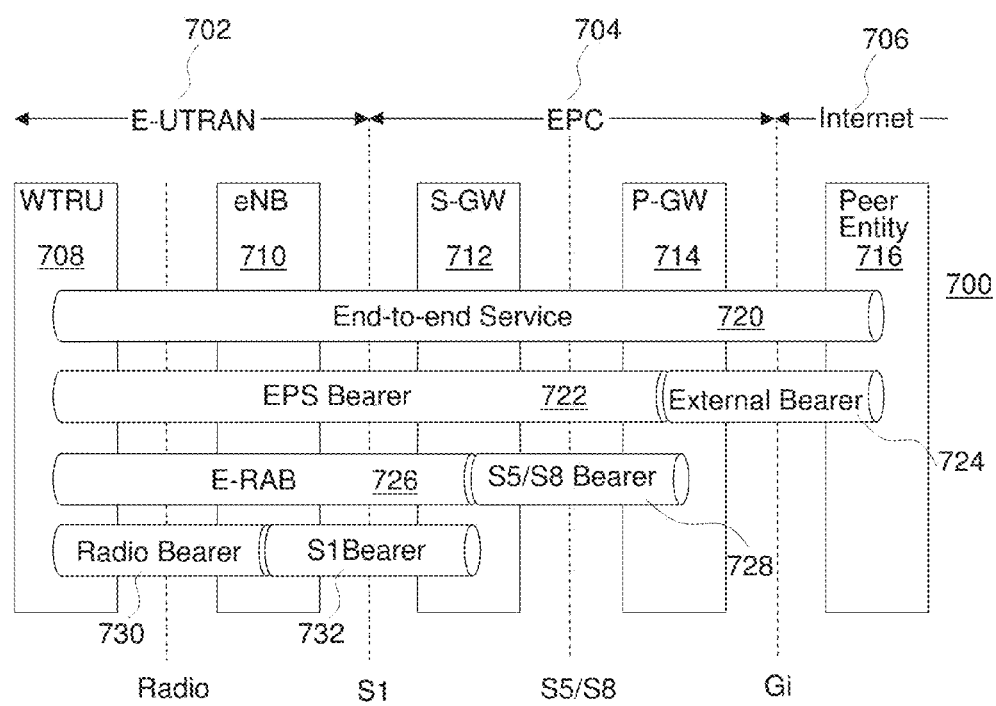
FIG. 7 shows an example of components of evolved packet system (EPS) bearers between entities in a E-UTRAN and an evolved packet core (EPC)

A response to paging between WTRUs may set up a resource allocation. FIG. 7 shows an example of evolved packet system (EPS) bearers between entities in a E-UTRAN 702 and an evolved packet core (EPC) 704. In this example, the E-UTRAN 702 may include a WTRU 708 and an eNB 710; the evolved packet core (EPC) 704 may include an SGW 712 and a PGW 714; and Internet 706 may include a peer entity 714. An EPS bearer 722 between the WTRU 708 and the PGW 714 may be composed of a radio bearer 730 between the WTRU 708 and the eNB 710, an S1 bearer 732 between the eNB 710 and the SGW 712 and S5 or S8 bearer 728 between the SGW 712 and the PGW 714. The radio bearer 730 and the S1 bearer 732 may be referred to in combination as the evolved-radio access bearer (E-RAB) 726. An external bearer 724 may also exist between the PGW 714 and the peer entity 716. All the bearers above together may provide end-to-end service 720 between the WTRU 708 and the peer entity 716.

Figure 8:
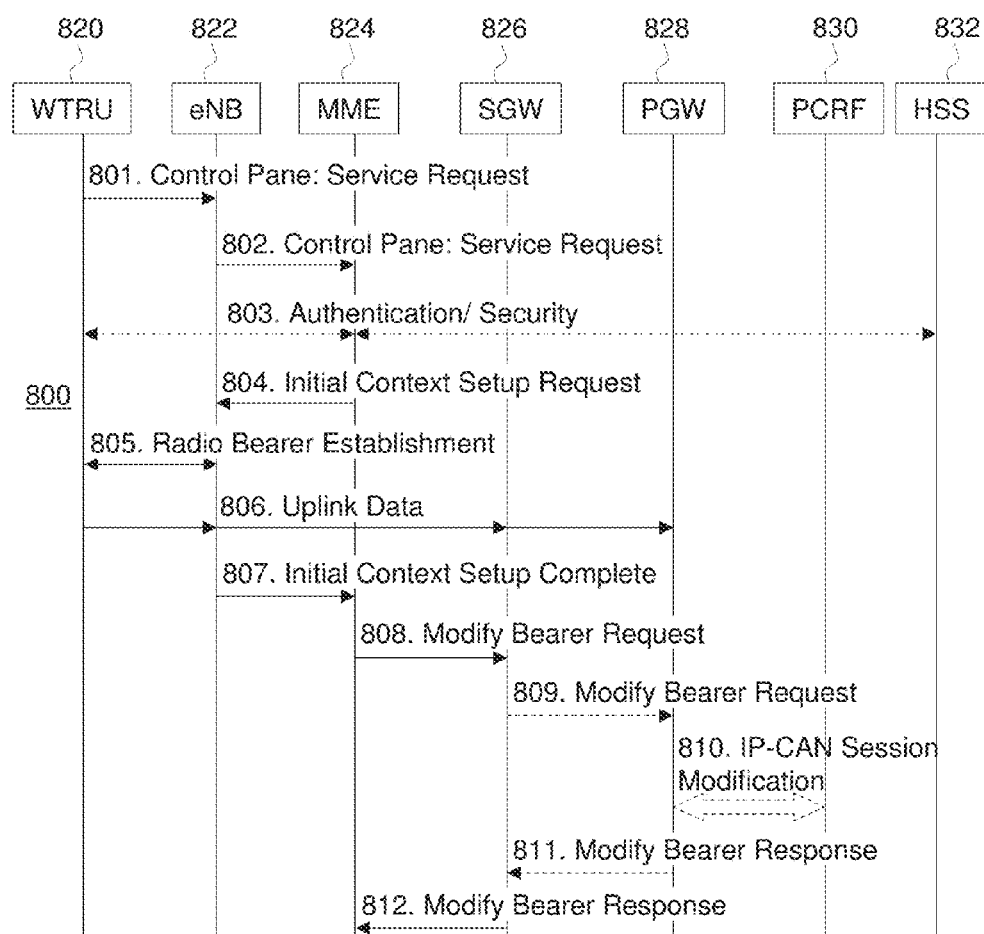
FIG. 8 shows an example signaling diagram for a service request procedure.

FIG. 8 shows an example signaling diagram for a service request procedure 800. FIG. 8 shows signaling between a WTRU 820, an ENB 822, an MME 824, a SGW 826, a PGW 828, an Policy and Charging Rules Function server (PCRF) 830, and a home subscriber server (HSS) 832. When a WTRU 820 is in idle mode, the WTRU's 820 control plane entity and the MME 824 may maintain the list of bearers that the WTRU 820 has previously activated. These bearers may be maintained as WTRU 820 context that may define the corresponding characteristics for the default bearer and each dedicated bearer, if any. When the WTRU 820 switches to connected mode, for reasons other than registration, such as periodic tracking area update (TAU), the WTRU 820 may send a control plane service request message 801 to the eNB 822, which in turn may send a control plane service request message 802 to the MME 824. Following an authentication and/or security procedure 803 between the network entities, the MME 824 may send an initial context setup request 804 to the eNB 822 in order to setup resources for all the bearers that are active and/or part of the WTRU's 820 context. Thus, when the WTRU 820 initiates a service request procedure 800, the MME 824 may setup the S5/S8 bearers and S1 bearers, and this may trigger the eNB 822 to setup establish the radio bearers 805. This may involve signaling between the MME 824 and the SGW 826, and the MME 824 and the eNB 822. Following radio bearer establishment 805, the WTRU 820, eNB 822, MME 824, SGW 826, and PGW 828 may send and/or receive uplink data 806, followed by the eNB 822 sending an initial context setup complete message 807 to the MME 824. The MME 824 may send a modify bearer request 808 to the SGW 826, which may forward the modify bearer request 809 to the PGW 828. The PGW 828 and PCRF 830 may perform an Internet protocol connectivity access network (IP-CAN) session modification 810.

Then, the PGW 828 may forward the modify bearer response 811 to the SGW 826, which may then send the modify bearer response 812 to the MME 824.

In the case of proximity services, the system or an application that is provided by the operator or a third party provider may know the location of a WTRU at a cell level. One way to know the WTRU's location on a cell precision level is to bring the WTRU to connected mode, if it is in idle mode. This may be done by paging the WTRU. For example, the MME may request that the E-UTRAN page the WTRU, which may in turn cause the eNB(s) to send a paging message.

Upon reception of a paging message, a WTRU may initiate the service request procedure. As illustrated in FIG. 8, this may trigger the network to establish the resources for all the WTRU's active bearers. Even though the system may only be interested in the WTRU's location (for example, a certain proximity application may need to take statistics about the WTRU location as a function of time, or for other purposes which don't require user plane resources), the system may generate a lot of signaling on the interfaces between the eNB and the MME, and the MME and SGW, and the WTRU may not even use the resources that are setup. This procedure may be inefficient as it may generate a lot of signaling for resources that will not be used by the WTRU or the system. The paging procedure and the service request procedure may be designed differently so that a WTRU may be brought to connected mode without setting up resources for the user plane for situations when the system is interested in know the location of the WTRU on a cell level.

A WTRU may consider a service request procedure to have failed if the radio bearers are not setup for the corresponding control plane EPS bearers. If the WTRU (for example at the radio resource control (RRC) layer) does not setup radio resource for the default bearer, the WTRU may locally deregister from the system and then re-attach again. Thus, for changes to the paging and service request procedures, the WTRU may be notified so that it may not consider the intentional de-establishment of resources as a failure case and hence may not re-attach to the system (which may also generate its own set of signaling).

The procedures herein may serve any of the following functions: enable MME-to-MME communication for the control of proximity services; enable an MME to push information to other MME(s) regarding the availability or location of WTRU(s) that are subscribed for proximity services; and enable control plane (i.e. NAS) communication between WTRUs. If an MME pages a WTRU to know the location of the WTRU on a cell level, this may setup resources for the user plane even in cases when the resources are not needed. Paging and service request procedures may be designed to avoid the setup of resources when they are not needed.

Inter-MME procedures and control messages may be used for proximity WTRU communications. According to an embodiment, an MME may communicate with another MME for the purpose of providing and/or controlling proximity services to WTRU(s). A procedure between MMEs may be used for proximity services for any of the following purposes: controlling a proximity service, which may include informing an MME about a request for proximity service, MME-to-MME control of allowing a service and/or communication path, and MME-to-MME control of modifying and/or terminating a proximity service; and providing information about WTRU availability for proximity service, which may include a pull or push model for the purpose of providing or distributing information by an MME to other MME(s) when the former receives new information about one or more WTRUs that are allowed to obtain proximity services.

Herein, sharing may be used interchangeably to refer to proximity services. Moreover, proximity service may refer to communication between at least two WTRUs that may be geographically close to or far from each other or that may be in the same and/or different cell, area, etc. Moreover, the actual data path between two or more WTRUs may be direct over the radio, or via the RAN, or via the CN, or via any other route. The WTRUs involved in the sharing (i.e. proximity service) may already be determined as being in a proximity relationship or the WTRUs may probe one another on whether one is in proximity to the other or whether one is trying to participate in data sharing (i.e. proximity services).

The scenarios and procedures may start from a source MME, on behalf of a requesting WTRU or on behalf of a proximity controlling node (which may be an MME as well), to a target MME, which may represent and/or serve the target WTRU. The target MME may be on the same or a different public land mobile network (PLMN) or for the same or different network operator or both.

According to an embodiment, an MME may start an inter-MME procedure by sending a signal (i.e. a message) to another MME (a partner MME) in order to accomplish a proximity-related task, examples of which are given below. The partner MME may be found in the proximity detection (i.e. determination) phase or obtained from the HSS by the source MME based on information obtained from the requesting WTRU. This inter-MME procedure may be used for several purposes including, but not limited to, starting, modifying, or terminating a proximity services session. For example, the message may be a proximity service request message. This may be implemented using any protocol such as a general packet radio service tunneling protocol (GTP).

FIG. 9 shows an example of a proximity service message 900, which may be transmitted between MMEs for example. Various fields are shown in message 900 to serve as examples and do not need to be included in the message. Additionally, other fields 918 not specified may or may not be included. The message type field 902 may indicate the type of message. For example, the message type field 902 may be set to a value that may indicate a proximity service. The service type field 904 may indicate the requested service i.e. the type of action needed. For example, the service type field 904 may take values indicating any of the following: "start proximity session," "modify proximity session," or "terminate proximity session."

The session and/or application identifier (ID) field 906 may be a common field or separate fields for the session ID and application ID. The session ID may identify a session being handled by the source and target MMEs. For example, the session ID may identify the session for the MME-to-MME communication, or it may identify the proximity services session of the WTRUs. The application ID may be a generic field that may be used to identify an application that the WTRUs may be using, or an application for which the MMEs are communicating.

The initiating WTRU identity field 908 may identify the WTRU under the MME that is sending the message 900. Multiple WTRU identities may be included initiating WTRU identity field 908, as explained further below. The terminating WTRU Identity field 910 may be used to identify the WTRU under the MME that is receiving the message 900. Note that there may be at least one terminating WTRU identity for at least one WTRU. The message 900 may include one terminating WTRU identity field 910 for every WTRU involved in the proximity services session. For example, the MME may send a message 900 and include the identities for multiple WTRUs in multiple corresponding terminating WTRU identity fields 910. The message 900 may have a field (not shown) to indicate the number of identities held in the message or the total length of the identity part from which the MME may figure out the number of WTRUs that are being addressed, assuming an identity length per WTRU is known.

The preferred data path field 912 may indicate the preferred data path that may be used for proximity services, which may be a preference set by the sending source or transmitting MME. If the preferred data path field 912 is not included in message 900, then a default or known data path may be used. For example, the default path may be configured in the network such as in every MME. The global Cell ID field 914 may identify the global cell identity that is currently serving a WTRU that is requesting proximity services. This may be used by the target MME to provide it to its RAN so that the two cells may perform direct connection for proximity data service, as explained in more details below.

The message to terminating WTRU field 916 may include data or a human readable message that may be forwarded to the target WTRU under the target MME. This field 916 may be included if the initiating MME receives such a message from a WTRU that is under this MME and that requests a proximity service. Other examples of fields 918 may be a time interval field indicating a time limit for a proximity service session, or a priority field indicating whether or not the WTRU under consideration is a high priority WTRU.

Upon reception of a proximity services message, such as the message 900 shown in FIG. 9, the recipient (i.e. target) MME may verify if the terminating WTRU is subscribed for the proximity service, and may take into account the WTRU's location, or other criteria accordingly. The target MME may verify the preferred data path as indicated by the source MME (if provided) and may verify whether or not the data path is permitted for the terminating (i.e. target) WTRU. For example, the source MME may have included that the preferred path for data sharing is direct WTRU-to-WTRU communication. The recipient MME may or may not allow such data path for its WTRU.

The target MME may inform the terminating WTRU about the request for proximity services and may forward the identity of the initiating WTRU and other fields such as the message to terminating WTRU field shown in FIG. 9. The recipient (i.e. target) MME may respond using a message, for example, a proximity service response message. FIG. 10 shows an example of a proximity service response message 1000. Any of the fields 902-918 of the proximity service message 900 of FIG. 9 may be included in the proximity service response message 1000. Additionally, the proximity service response message 1000 may include the result field 1002, which may indicate the result of the previous request sent by the source MME.

For example, the result field 1002 may indicate any of the following: service accepted, which may indicate that service has been accepted for the indicated data path or a default data path; service rejected by user, which may indicate that the terminating user rejected the request and the initiating user should not re-attempt, possibly for a pre-determined or know amount of time; service not allowed for user, which may indicate that the service is not allowed for the terminating user; service not supported in MME, which may indicate that the service is not supported in this MME, such that the recipient MME should no longer send any requests for proximity with the MME that sent this message (this may be specific for the "service type" that was previously requested by the source MM, for example, proximity service may be supported by the terminating MME but modification of proximity service may not be supported; service temporarily not available, which may indicate that the service is temporarily not available, for a specific WTRU or for all WTRUs (which may use additional fields in the response message 1000), and possibly for an indicated or default time period (where the indicated time period may be included in a separate field); and service not allowed for this PLMN, which may indicate that service is not supported with the PLMN that is requesting the service (i.e. initiating/source MME's PLMN identity).

If the target MME accepts the request for proximity services, it may then request its RAN node (for example, the eNB) to setup resources for the proximity service. The resources may be setup through the eNB in the same manner as described below for the initiating/source MME.

The MME that receives the proximity service response message may perform any of the following actions depending on the value of the "Result" field. For example, if the result field indicated service accepted, the MME may indicate to the WTRU via a control plane message that the service was accepted. The MME may also include an indication about the type of data path that is to be used, for example, direct communication or indirect communication. The MME may also include an identity of the peer WTRU or a session identity that may be used for the communication. Upon reception of the control plane message from the MME, the WTRU may initiate a proximity service with its peer WTRU and may also use the session ID, as provided by the MME, to identify the proximity service session. In another example, if the result field indicated service accepted, the MME may request the RAN to setup resources for the data sharing (i.e. proximity service) session.

In an example, if the result field does not indicate service accepted, the MME may send a control plane message to the initiating WTRU to indicate that the service is not allowed. The MME may include a cause code such as "User rejected", for example, if such a cause code is received by the MME. The MME may indicate a temporary time after which the service may be re-attempted. In another example, if the result field does not indicate service accepted, the MME may store a flag to indicate that no further proximity service is possible with the target MME and/or PLMN. For example, if the result field indicated "Service not supported in MME" or "Service not allowed for this PLMN".

The MME may use any of the following methods to identify the target MME that is serving the target WTRU. The MME may receive supporting information from the source WTRU. This information may be the service ID, application ID, Mobile Subscriber Integrated Services Digital Network (ISDN) Number (MSISDN), PLMN ID, the globally unique temporary ID (GUTI), or other identification that may be related to a particular service such as a proximity ID. The MME may verify the PLMN ID and/or GUTI to identify the serving MME. Note that the WTRUs may have exchange such information either via manual settings or via direct radio-to-radio communication. The MME may also provide any of the above identities to an entity (e.g. a server) which may have a mapping between the provided identity and the serving MME and/or PLMN. Alternatively, this information may be locally maintained at each MME.

According to another embodiment, a source or target MME may request the RAN (e.g. eNB) to setup up resources for proximity services. For a given proximity service that is already established, the MME may request the eNB to modify or terminate the session and hence handle the resources accordingly. For example an application protocol (AP) message, such as an S1 application protocol (S1AP) message, may be defined to be used for proximity services or an existing AP message may be may be modified to include additional IEs for proximity services. For example, the MME may send an S1AP message that may include any of the following IEs.

An action type IE may be included, to indicate the type of action expected of the eNB or the type of service being requested by the MME. For example, the action type IE may indicate "Setup resource for proximity service", or "clear resources for proximity service", or "Modify resources for proximity service". A WTRU identity IE may be included, which may identify the WTRU using any type of identity that may be defined for proximity services, including the identifiers discussed above. The MME may include several identities when there are multiple WTRUs that are to engage in proximity services, for example in the case of network sharing when both, some or all of the WTRUs are under the same eNB and in the same cell.

A data path IE may be included, which may indicate the data path that should be used for the service. The data path IE may indicate the data path as "direct WTRU-to-WTRU", or "Via eNB", or "via core network", for example. A next hop address IE may indicate the address/identity of the entity with which resources should be setup for proximity. This may be an eNB or a SGW or a PGW, for example. The data path IE may be included if the proximity services involve a data path between two eNBs for example. A session ID may be included and may be a unique identifier of the proximity services session for the WTRU(s) involved.

Upon reception of the S1AP message from the source or target MME, the eNB (under the source or target MME) may take any of the following actions. If the "Action type IE" indicates "Setup resource for proximity service", the eNB may contact the necessary entity, as may be identified in the "Next hop entity" IE, to setup the resources for the proximity service. The eNB may execute RRC procedures, including for example RRC Connection Reconfiguration, towards one or more WTRUs for the purpose of establishing the necessary resources for proximity services. If the S1AP message indicates that the data path is direct and there are two WTRU identities in the S1AP message, the eNB may execute RRC procedure towards each of the two WTRUs and setup data radio bearers for the proximity service. The eNB may also indicate to each of the WTRUs an identity of the other WTRU and also whether the data path is direct. The eNB may also contact another eNB for the purpose of setting up resources for the proximity service, and may provide the session ID as provided by the MME. This may be done via, for example, an S1 and/or X2 interface or any other interface that may be connecting eNBs together.

If the "Action type IE" indicates "Clear resource for proximity service" or "Modify resource for proximity service", the eNB may then clear the resources with the WTRUs and or entities that may be part of the data path. For example, the eNB may execute RRC procedure(s) to clear and/or modify resources with at least one WTRU. The eNB may also execute S1 and/or X2 procedures to clear and/or modify resources with the eNB that may be part of the data path for proximity.

According to an embodiment, a procedure may verify a partner MME controls and/or serves a partner WTRU, whether or not the WTRU is in proximity. An originating MME may start a procedure by sending a message, such as a proximity service request as discussed above, to another MME in order to verify that a partner WTRU, or a partner WTRU to be, is under its control or under its service. By way of example, similar to what was discussed with regard to FIG. 9, the message may include any of the following information: a service type field, which may indicate the service type as "verify a WTRU's serving MME", for example; one or more terminating WTRU identity fields corresponding to the number of WTRUs participating in the proximity service; the originating (or initiating) WTRU's identity in case the terminating WTRU or RAN needs the information; an indication of whether the terminating WTRU has already been determined under proximity; and the terminating or partner WTRU's proximity information, if it has already been found under such a proximity relationship.

The terminating or partner MME may send a response back (for example a Proximity Service Response, as described above), which may indicate the result of the request (e.g. success or failure) and may include additional information with respect to the concerned/terminating WTRU, such as its location information, its WTRU capability and its system attach point (i.e. the serving eNB and/or the cell).

The following procedures may be used to verify a partner WTRU's proximity for data sharing. According to an embodiment, an originating MME may start a procedure by sending a Proximity Service Request message to a target MME in order to confirm from the MME information regarding a target WTRU. Such information may include, but is not limited to, whether the target WTRU (whose proximity relationship is undefined) is in proximity relationship with the originating WTRU or not necessarily related to proximity or proximity with other WTRUs. The procedure may be triggered by, for example, an originating WTRU requesting that a proximity relationship discovery action to be started or a proximity status for a concerned WTRU to be confirmed, which may be based on network policies or other applications or servers that may have sent such a request to the MME. In another example, the procedure may be triggered by a network controlling node that may start to provide a proximity relationship to an originating WTRU and a target WTRU and/or a consent for mutual action(s) under a proximity relationship.

The parameters included in the Proximity Service Request message for the above functionality may include, but are not limited to: the service type of "WTRU proximity Status discovery" or "WTRU proximity status tracking"; the concerned/terminating WTRU identity or WTRU-ID related Information; and/or the originating WTRU's identification. In addition, the following proximity related information may be included: if the WTRUs are not already under proximity relationship, then the location of the originating WTRU; the proximity definition including the range definition; and the proxy-property and/or category information, such that certain category and/or property WTRUs may be screened for proximity.

The terminating MME may send a Proximity Service Response message back to the source MME, which may indicate the result of success or failure with respect to the purpose of the request. The Proximity Service Response message may include additional information with respect to the concerned WTRUs, including, but not limited to: its location information, its capability, current WTRU state, and its system attach point (i.e. the service eNB and/or the cell).

The originating MME may request that the terminating MME track the proximity status of a WTRU. In this case, the terminating MME may to send any of the following: periodic Proximity Service Response messages back to the originating MME about the proximity status of the concerned WTRU with respect to the originating WTRUs location or other condition; or event-driven Proximity Service Response messages back to the originating MME when the proximity status of the concerned WTRU(s) has changed, for example, from in-proximity to out-of-proximity.

According to an embodiment, an MME may send a message to other MME(s) to push information about other WTRUs, including for example proximity information. The MME may use a proximity service message, as described above, as a push message and may set the fields accordingly. Each MME may have defined events which may trigger the push of information, including location information for proximity or other services, to other MME(s) and/or server(s). The events or WTRUs to "monitor" may be received in the MME from WTRUs (e.g. public safety WTRUs or WTRUs used for public safety purposes) or from other MMEs. For example, when a WTRU switches to connected mode and hence establishes a signaling connection with an MME, the event "WTRU in connected mode", may be met and the MME may take action to inform other entities, such as other WTRUs, MMEs, or servers, that the WTRU (or set of WTRUs) are now in connected mode and may also provide their location information. The MME may obtain location information for a WTRU using the location services, as offered in LTE systems for example.

According to another embodiment, an MME may send a message to other MMEs to request information (such as location information for proximity or other service) for at least one WTRU. For example, the MME may request the target MME to provide it with information (e.g. location information related to proximity or other service, or other information for other services) when the identified WTRU enters a cell, or an area or goes to connected mode. The MME may then set such events to monitor the activity of certain WTRUs. The events may not only relate to WTRUs going to connected mode, but other events may be defined including, but not limited to: WTRUs becoming available for proximity or other services, or WTRUs requesting a specific IP connection or any other service and/or connection. The proximity services message, as described above and in FIG. 9 for example, may also be used for this purpose with appropriate values in the fields.

According to another embodiment, procedures may establish a data sharing path for proximity WTRUs. Under triggering, an originating MME may start the procedure of establishing a data sharing path between two (or more) proximity WTRUs by sending a signaling message, such as Proximity Service Request message, to another MME, which may control and/or serve the partner WTRU in order to find and establish a data sharing path, or other types of communication link, between the partner WTRUs.

The procedure performed by a MME may find the data sharing path for the proximity WTRUs based on the radio environment, network conditions, the network policies or other selection criteria. For example, the options for paths may include, but are not limited to: a default path being the first found available path; the shortest path, which may include sharing a common user plane node with the fewest number of network resources; and the fastest path, which may be the path with the lightest traffic load and/or may afford the high quality of service (QoS) in the best interest of the WTRU, user and/or proximity service or application.

A data sharing path may be formed symmetrically (where the path may be the same in both directions between the partner WTRUs) or asymmetrically (where the path may be different between partner WTRUs). The options for data paths between WTRUs may include, but are not limited to: via a direct air interface path, which may be used if there is available resource and the partner WTRUs are close enough to allow direct over-the-air transmission and/or reception; via a same eNB, without passing through the core network; via two eNBs, for example across the X2 interface; via a common SGW; via a common PGW; and via two PGWs.

Figure 11:
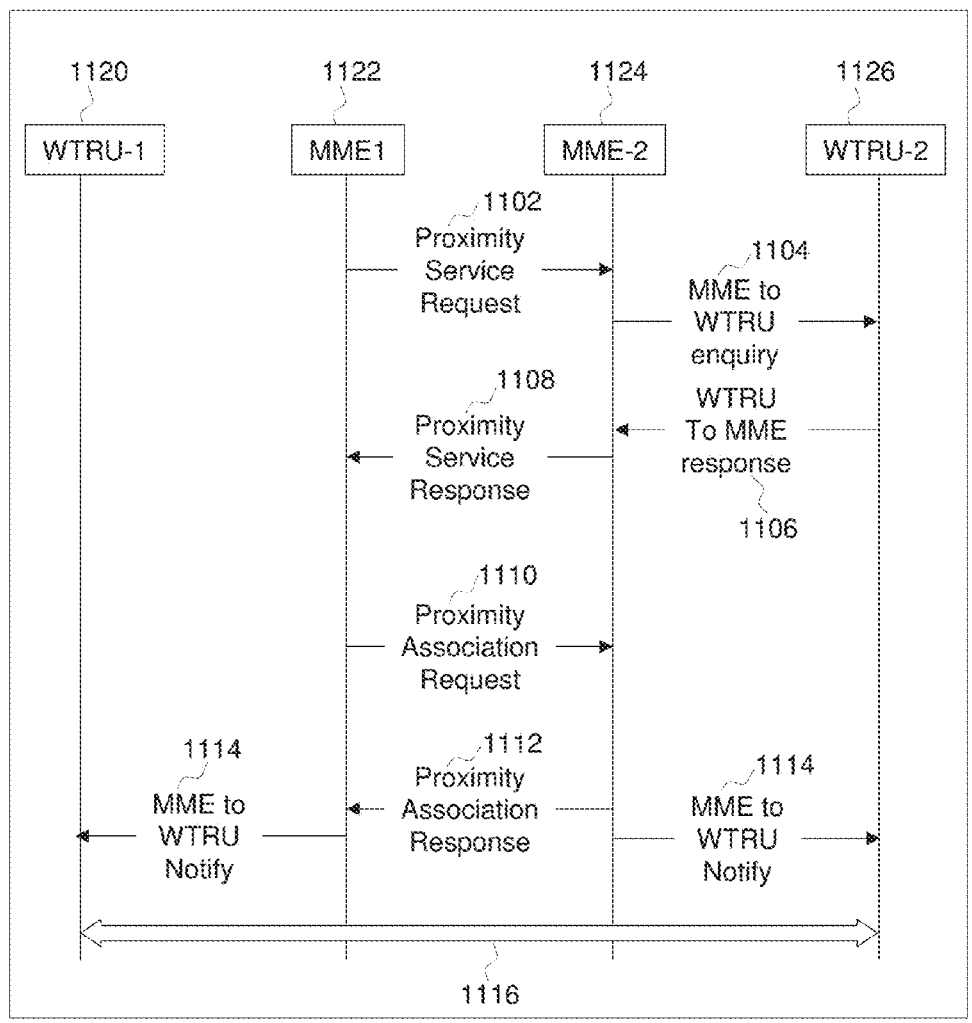
FIG. 11 shows an example signaling diagram of a method for enabling proximity services between two WTRUs associated with different MMEs.

FIG. 11 shows an example signaling diagram of a method 1100 for enabling proximity services between two WTRUs associated with different MMEs. In this example, WTRU 1120, served by MME 1122, is seeking to engage in proximity services (i.e. data sharing, or any other services) with WTRU 1126, served by MME 1124. The originating MME 1122 (which serves the originating WTRU) may send a proximity service request message 112 to a terminating MME 1124 that serves the partner WTRU 1126. The proximity service request message 111 may include any of the information described above, for example, the originating WTRU's 1120 connection environment or "preferred data path", the ID of the serving eNB for WTRU 1120, the global cell ID, and/or the originating WTRU's 1120 capabilities.

The terminating MME 1124 may send an inquiry 1104 to the terminating WTRU 1126 (and/or the WTRU's serving RAN), and may receive a response 1106 from the WTRU 1126 (or the WTRU's RAN). The terminating MME 1124 may send a proximity service response message to the originating MME 112, which may include, for example, the partner/terminating WTRU's 1126 connection environment (i.e. the "preferred data path") and WTRU's 1126 capabilities.

The originating MME 1122 may suggest the data sharing path to the terminating MME 1124 via, for example, a Proximity Association Request message 1110, and the terminating MME 1124 may confirm, modify or deny (based on conditions discussed above) the proposed data sharing path by sending a proximity association response message 1112 back to the originating MME 1122. For example, if the capabilities of the partner WTRUs 1120 and 1126 and the eNBs/cells (not shown) would allow a WTRU-to-WTRU direct radio path, then a direct radio link data sharing path may be recommended. In another example, if the partner WTRUs 1120 and 1126 are sharing a same eNB, then the sharing path may go from the same eNB. The originating and terminating MMEs 1122 and 1124 may send notification messages 1114 to their respective WTRUs 1120 or 1126 (or eNBs) to setup the data sharing path 1116 for the partner WTRUs 1120 and 1126.

According to another example embodiment, following a Proximity Service Response message, an originating MME may make the sharing path decision and notify the terminating MME with a Proximity Association Request or Proximity Service Request and subsequently notify RAN to setup and configure the data sharing path. According to another example embodiment, if both the originating MME and the terminating MME have all the information about their perspective WTRUs and their perspective preferred data paths, the originating MME may send the first Proximity Service Request message, with the preferred data path information, to suggest the data sharing path. The terminating MME may finalize the decision if the terminating MME perceives that the preferred data path from the originating MME agrees with its own preferred data path and the serving RAN is able to allocate it.

In the above example scenarios, the originating MME may be triggered to start a proximity service request procedure. In one example, a trigger may be from a network controlling node specifically for proximity service functionality such that the proximity service requesting (i.e. originating) WTRU may authorize the controlling node that once another proximity WTRU is found, the originating MME may act directly to make the proximity WTRUs connect to one another with network and/or radio links. In another example, the trigger may be from a requesting WTRU, which may start the data path building initiation after learning the availability of a proximity WTRU, from the proximity controlling node or other means.

According to another embodiment, when the proximity relationship about two or more WTRUs is determined, the network proximity service controlling node or the acting MME may already have the WTRU and/or network information in the course of proximity detection. Examples of such information may include, but or not limited to: WTRU identities; current WTRU locations; PLMNs associated with WTRUs; WTRU service requirements; WTRU capabilities; current serving eNB identities (e.g. eNB-IDs, global eNB-ID, network address, or IP-address); network sharing attributes; load conditions (i.e. air interface resource conditions); eNB capability on whether it could assign WTRU direct air-to-air communications; controlling or serving MME identities (e.g. MME-IDs, network address, IP address); and PLMNs associated with MMEs.

Figure 12:
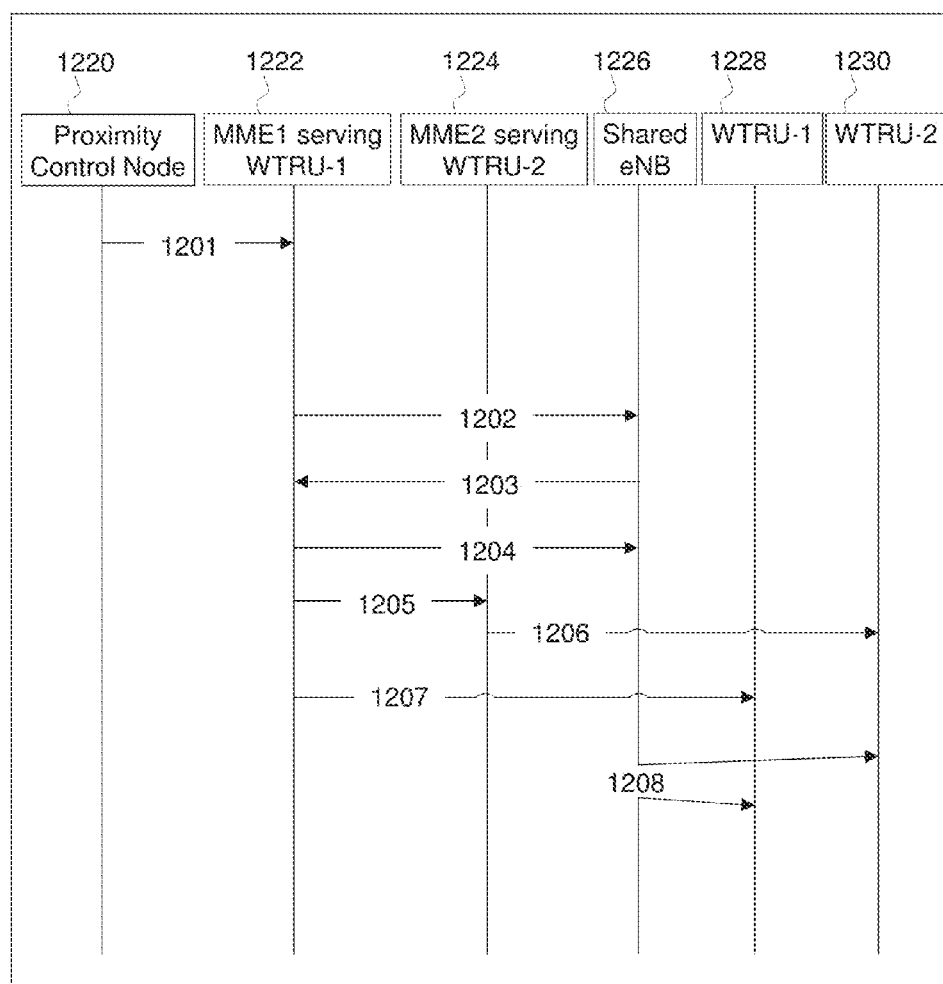
FIG. 12 shows an example signaling diagram for an inter-MME procedure 1200 to configure proximity sharing between WTRUs.

FIG. 12 shows an example signaling diagram for an inter-MME procedure 1200 to configure proximity sharing between WTRUs. In this example, WTRUs 1228 and 1230 are served by respective MMEs 1222 and 1224 and share eNB 1226. The proximity control node 1220 may have all the proximity related information during the proximity discovery phase. The proximity control node 1220 may send a notification 1201 to the requesting WTRU's 1228 associated MME 1222 with information about, for example, the target WTRU's 1230 associated MME 1224, or other relevant information to make a proximity data link between the two proximity WTRUs 1228 and 1230.

Based on the proximity information, MME 1222 may determine that the two WTRUs 1228 and 1230 are sharing a same eNB 1226, with or without network sharing. The MME 1222 may send a request message 1202 to the shared eNB 1226 requesting a sharing path with the eNB 1226 for the two proximity WTRUs 1228 and 1230. The requesting MME 1222 may determine the hinging point or the focal point, which may be an eNB, SGW, PGW, or direct radio communication link based on the available WTRU proximity related information. Two WTRUs 1228 and 1230 under the same eNB 1226 may use/share the eNB resource to proximity communication. The eNB 1226 may determine whether the two proximity WTRUs 1228 and 1230 may communicate using its cell resources for the direct radio path in a period of time. The two WTRUs 1228 and 1230 under the same cell may use the cell resources to communicate directly over the radio link, although one WTRU may reverse its uplink and/or downlink transmission and/or reception.

The eNB 1226 may transmit a response message 1203 to the MME 1222, which may indicate that it has the resource for making such a connection available and may suggest a proximity sharing path configuration for the two WTRUs.

The MME 1222 may send a configuration message 1204 to the eNB 1226 indication the sharing path for the WTRUs 1228 and 1230, and may include an activation time for the data sharing. The requesting WTRU's 1228 MME 1222 may send a configuration message 1205 to the target MME 1224 to configure WTRU 1230. The target MME 1224 may send a configuration message 1206 to the WTRU 1230, via the shared eNB 1226, in order to configure the sharing path through the eNB. The originating MME 1222 may also send a configuration message 1207 to WTRU 1228, via the shared eNB 1226, in order to configure the sharing path. The WTRUs 1228 and 1230 and the shared eNB 1226 may exchange further messages 1208 in order to configure the sharing resources at define an activation time, for example. The WTRUs 1228 and 1230 may then be connected to the designated resources for the data sharing via the sharing path through the shared eNB 1226.

According to another embodiment, a set of WTRU-to-WTRU protocols may enable direct communication between proximity WTRUs at a control plane (e.g. NAS) level. A WTRU-to-WTRU control plane protocol may be via an MME or via a radio interface. A control plane protocol may run between two WTRUs in addition to and/or separately from control plane (NAS) protocols that may run between the WTRU and MME. According to one embodiment, the control plane message may be transmitted via the MME, which may act like a forwarding node and may verify the target WTRU to which the message is forwarded without actually processing the data.

According to another embodiment, the control plane message may be directly communicated between the two WTRUs using a direct radio link. This may be done after the WTRUs are informed that such control plane communication may be allowed between them, which may be received in one of the following ways: with a registration procedure such as, an Attach Accept or Tracking Area Update Accept, or any control plane message; by receiving an explicit control plane or RRC message indicating that the WTRUs can/should operate with direct NAS communication. The WTRUs may be configured for direct control plane communication via manual setting changes or via, for example, Open Mobile Alliance device management (OMA DM) messages, over-the-air (OTA) messages, or access network discovery and selection function (ANDSF) messages.

The WTRUs may perform direct control plane communication if they access the system with certain access class that may be configured in the Universal Subscriber Identity Module (USIM). The control plane message may be used for other services described below. Thus, the control plane message may be generically used to share control plane signaling, or signaling related to applications that may use the control plane protocol, or for text message transfer between WTRUs, for example.

The control plane message may be achieved by defining a dedicated control plane message or by modifying other control plane messages with additional IEs. For example, the Generic Control Plane Transport message may be modified. The control plane message content and the WTRUs actions upon sending/receiving the control plane message are described in the following.

The following assumptions may be relevant to the procedure. The WTRUs may already be engaged in communication via the MME with other control plane messages. The WTRUs may know the identities of each other. The identities may be, for example, 3GPP related identifications such as MSISDN, International Mobile Subscriber Identity (IMSI), temporary mobile subscriber identity (TMSI), or other identification such as Session Initiation Protocol (SIP) uniform resource identifiers (URIs), email-like addresses, any proximity-related identification, or identification for other services that may be defined. The WTRUs may have already discovered each other, at the radio or control plane level, and may have also exchanged some identification parameters (for example, those listed above or other) and/or application related parameters such as application ID, application type, application name, for example.

Figure 13:
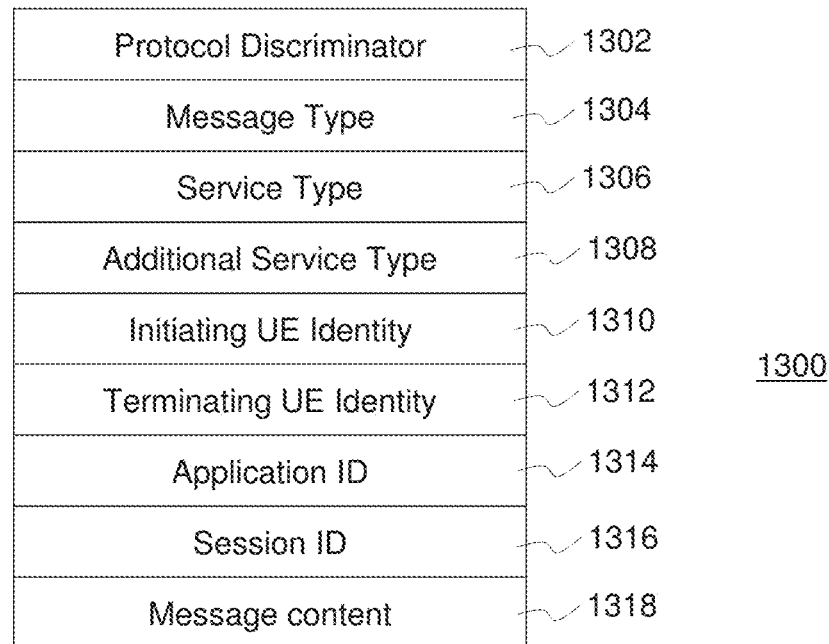
FIG. 13 shows an example WTRU-to-WTRU control plane message to be exchanged between WTRUs engaged in proximity services.

FIG. 13 shows an example WTRU-to-WTRU control plane message 1300 to be exchanged between WTRUs engaged in proximity services. Any of the following fields may or may not be included in the control plane message 1300, and other fields not shown may be included. The Protocol Discriminator field 1302 may indicate that the control plane protocol entity should process the message. For example, field 1302 may be set to "MME entity" or any other entity that may be supported by the control protocol. The Message Type field 1304 may indicate that the message 1300 is for WTRU-to-WTRU communication. For example, field 1304 may have a value set to "WTRU-to-WTRU control message".

The Service Type field 1306 may indicate the type of service for which the message 1300 is intended. For example, field 1306 may be set to "proximity service" or any other value for other services that may be defined. The Additional Service Type field 1308 this may be used to indicate additional information for the service type. For example, field 1308 may have a value set to "public safety" or "social application". By way of example, the Service Type field 1306 may indicate proximity service in general, while the Additional Service Type field 1308 may indicate the general use case within the proximity service and this may be set to "public safety" to indicate that the message is used for proximity services that relate to public safety applications.

The Initiating WTRU Identity field 1310 may identify the sending WTRU, for example using any of the identifiers discussed above. The Terminating WTRU Identity 1312 may identify the WTRU for which the message 1300 is intended (i.e. the target or destination WTRU), for example using any of the identifiers discussed above. The Application ID field 1314 may identify an application. In an example, the application ID field 1314 may be contained within the Message Content field 1318. Example of application IDs may be "Facebook" or "Public Safety/Emergency". Application IDs may be uniquely defined so that different applications do not have the same ID.

The Session ID field 1316 may identify a session, and may include a session ID for each application ID which might have multiple sessions. The Message Content field 1318 may contain the application-related data that is to be exchanged between the WTRUs. Note that this field may contain other fields within it. Examples of fields (not shown) that may be contained within the message content field 1318 include, but are not limited to: a data type field, which may be set to a known value that may be defined at the application layer (e.g. SIP, session description protocol (SDP), or plain text message); a Message Length field, which may indicate the length of the Message Content field or the length of the actual data that may follow; and the Data field, which may hold the actual data to be exchanged between the WTRUs.

A maximum length of the message 1300 may be defined such that the WTRUs do not send messages that exceed the maximum length. Examples of message that may include control plane message fields, as shown in FIG. 13, include but are not limited to: the uplink control plane transport message, or the generic uplink control plane transport message. The message type field 1304 may be modified accordingly based on the containing message. Control plane messages 1300 may be transmitted between WTRUs in a security protected manner using, for example, control plane security mechanisms. Moreover, additional fields for security (not shown) may be included in the message 1300. For example, a security header IE (not shown) may also be included as the message 1300 may be sent as an initial control plane message.

According to an embodiment, a source WTRU may, upon request from upper layers (e.g. proximity application), send a control plane message to another WTRU if the source WTRU is configured to do so or is informed that it is supported. The control plane layer (or EPS mobility management (EMM) entity) may contain information about the target WTRU identity or may receive such information from the upper layers. The control plane entity (e.g. EMM entity) may create the control plane message and send it to the target WTRU. The source WTRU may send the control plane message either directly over the radio interface (e.g. using direct radio communication which is assumed to be enabled in the WTRU) to a partner WTRU, or the source WTRU may send the message via the MME.

Upon reception of a control plane message from a source WTRU by an MME, the MME may take any of the following actions. The MME may verify if the source WTRU is allowed to send this message and if the message is security protected. If security fails, the MME may discard the message or respond with a new control plane message to indicate that the security failed or the message was not sent with a corresponding cause code (e.g. "terminating WTRU not known", or "service not allowed").

The MME may verify if the target is allowed to receive the message and if the target is registered in the system. The MME may respond to the source WTRU with a failure indication with values that may be set to "terminating WTRU not registered", "terminating WTRU not available", or "service not allowed for terminating WTRU", for example. The MME may verify if the target allows such a communication with the source WTRU. For example, every WTRU may provide the MME with a list of WTRUs with which such communication is desired (or not). Thus, the MME may verify if the target WTRU allows this communication with the source. The WTRU may provide such information within any control plane message. Alternatively, the MME may receive this information from any node in the network including, for example, an HSS.

The MME may verify whether the WTRUs in question belong to a special class of WTRUs, for example a public safety organization. The MME may only allow such communication between such users that belong to certain special classes. If the request is accepted, the MME may forward the control plane message to the terminating WTRU, or the MME may first page the terminating WTRU. The MME may forward the control plane message to a server via a well-defined interface which may require message translation. The MME may populate a control plane message with the received fields to forward all or a subset of the fields in the received control plane message.

Upon reception of such a control plane message by a terminating WTRU, either directly from an originating WTRU or via the MME, the terminating WTRU may perform any of the following actions. The terminating WTRU may provide upper layers the received information such as all or a subset of the message fields discussed above.

The terminating WTRU may discard any part of the message if it does not have a session ID or application ID that matches those received in the message field. For example, there might be certain WTRUs that only engage in mobile originated sessions. Hence, any message received from other WTRUs may have fields for applications or sessions that match those that are local in the WTRU. The control plane layer (e.g. EMM entity) may maintain a list of application IDs and/or session IDs that are currently active with a particular service type such as proximity services. The terminating WTRU may verify the service type or additional service type IE and may send the received information to public safety applications if the service relates to public safety applications, for example.

According to an embodiment, the control plane layer may define and use acknowledgement mechanisms to acknowledge the receipt of direct control plane messages. This may be achieved by defining a value for the service type IE and setting it to "ACK" for acknowledgment, for example. In another example, a dedicated control plane message or lower layer message may be defined. If the control plane implements acknowledgement mechanisms, the control plane message (for example the control plane message 1300 of FIG. 13) may include a Transaction ID field so that acknowledgements may be mapped to a particular transaction, where a transaction may imply a single transmission of the proposed message. The originating WTRU may increment the transaction ID upon subsequent transmissions for the same application/session, for example.

In addition to the fields described above, other fields may be included in the control plane message to indicate whether a service (e.g. proximity service) is to be initiated, modified, or terminated. For example, an "Action Type" IE may be defined and included in the control plane message. Thus to initiate a service, such as a proximity service, a WTRU may (e.g. if configured or allowed to directly do so with another WTRU) send a control plane message, as described above, and include the "Action Type" field and may set its value to "Start session". Similarly, a value of "End session" or "Modify session" may be used to terminate or modify an existing service (e.g. proximity service) session, respectively.

Figure 14:
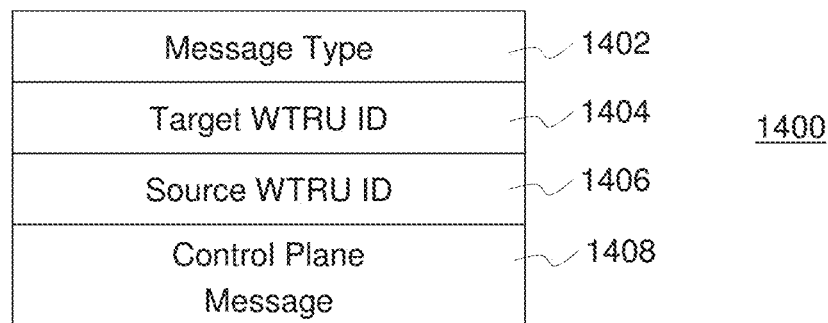
FIG. 14 shows an example WTRU-to-WTRU Radio Resource Control (RRC) message, including a control plane message, to be exchanged between WTRUs engaged in proximity services.

According to another embodiment, a WTRU-to-WTRU control plane protocol may exist via a RAN (e.g. eNB). It may be a network policy that proximity services; (or other services') data may be communicated via the RAN (e.g. via an eNB that may be serving at least two WTRUs that want to engage in a proximity service session). FIG. 14 shows an example WTRU-to-WTRU Radio Resource Control (RRC) message 1400, including a control plane message 1408, to be exchanged between WTRUs engaged in proximity services.

In the example of FIG. 14, the WTRUs may exchange control plane messages 1408 directly, and/or over the eNB. The RRC message may or may not include a message type field 1402, a target WTRU ID field 1404, a source WTRU ID field and a control plane message field 1408, among other fields not shown. In one example, an originating WTRU may send the control plane message 1408 message as part of an RRC message 1400 to a serving eNB. The eNB may remove the control plane message 1408 from the RRC message 1400 and in turn send the piggy-backed control plane message 1408 to the target WTRU, which may also be piggy-backed in a downlink RRC message, like RRC message 1400. This may be in contrast to control plane messages 1408 being received by the eNB and directly forwarded to the MME. In this case, an eNB may fetch a piggy-backed control message 1408 from an RRC message 1400 and send the control plane message 1408 in another RRC message (resembling RRC message 1400) to a target WTRU.

According to another embodiment, an eNB may directly route a WTRU-to-WTRU RRC message 1400, which may carry the direct control plane message 1408, from one WTRU (under proximity or not) to the other WTRU, if the target WTRU is served by the eNB(s) in the path. An RRC message 1400 from an originating WTRU to the eNB may carry a control plane message 1408 that is targeted for another WTRU. The use of a dedicated RRC message 1400 may imply that the eNB may not send the piggy-backed control plane message 1408 to the MME but instead the control plane message 1408 may be sent or routed to the target WTRU in a dedicated RRC message 1400.

The Message Type field 1402 may indicate that the RRC message 1400 carries a control plane message 1408 that may be forwarded to another WTRU and not to the MME. For example, the message type 1402 may be set to "WTRU-WTRU control transfer". The Target WTRU ID field 1404 may identify the WTRU uniquely within the cell. This may be a WTRU proximity identification, any of the previous listed identities, a cell radio network temporary identifier (C-RNTI) (assuming the source has already obtained this information via direct radio communication with the target WTRU), or a known RNTI (e.g. for emergency personnel and public safety uses). The Source WTRU ID field 1406 may identify the WTRU uniquely within the cell. This may be a WTRU proximity identification, any of the previous listed identities, a C-RNTI (assuming the source has already obtained this information via direct radio communication with the target WTRU), or a known RNTI (e.g. for emergency personnel and public safety uses). The control plane Message 1408 may be the piggy-backed control plane message that is to be forwarded to the target WTRU. Other fields not shown in RRC message 1400 include: bearer ID field or a channel ID field may be included in case the WTRU-to-WTRU communication may involve multiple applications and therefore multiple bearers or channels running at the same time.

Upon reception of an RRC message carrying a control plane message, such as the RRC message shown in FIG. 14, the eNB may perform any of the following actions. The eNB may verify if the source WTRU is allowed to send the RRC message. Note that the MME may provide the eNB with an indication in the S1AP messages (e.g. WTRU Context Setup Request message) that may indicate if this service is allowed for the WTRU in question. The eNB may verify if the target WTRU is served by the eNB or is served by another eNB with which a connection (such as an X2 connection) exists. The eNB may verify an identification mapping table and/or scheme that it may maintain for all or subset of WTRUs that are served by this eNB, as discussed further below. The eNB may then forward the control plane message to the target WTRU as identified by the C-RNTI (or any RNTI), which may map to the WTRU proximity identification.

For example, the MME may provide the eNB with a WTRU's proximity identification in every S1AP message. For example, upon transitioning to connected mode and during the context setup at the eNB, the MME may provide the eNB with the WTRU's proximity identity in the S1AP message (e.g. the WTRU Context Setup Request message). The eNB may create a mapping between the provided ID and the C-RNTI of the WTRU. The eNB may also be informed by the MME whether this WTRU belongs to a special group of WTRU, for example a public safety group.

The eNB may also then provide the WTRU with a special RNTI such as a proximity-RNTI, or group-proximity-RNTI, for example. In another example, if the eNB receives a WTRU proximity identification from the MME, the eNB may forward this identification to the WTRU in any RRC message such as a RRC Connection Reconfiguration message. The eNB may also allocate a special RNTI regardless of whether a WTRU proximity identification is received from the MME. Based on the identification and/or the use of a mapping table at the eNB, the eNB may create another downlink RRC message and include the control plane message within it. Such an RRC message and/or control plane message may be similarly used in either the downlink or the uplink.

A WTRU may or may not be informed via control plane signaling that WTRU-to-WTRU control plane communication may be performed over RRC messages, as described above. The WTRU may use this scheme if configured to do so by the eNB via RRC messaging. Another example trigger for a WTRU to use the proposed scheme is if the WTRU is configured to operate as public safety provider, either via manual setting or by using a special access class to access the system. For any of the above indications, the RRC may send the RRC message containing the control plane message, upon request from the control plane layer, to another WTRU. Upon reception of the RRC message containing the control plane message, whether via the RAN (e.g. eNB) or direct radio interface, the RRC layer in the terminating WTRU may provide the control plane layer with the received control plane information in the RRC message.

The above described protocol and procedure for RRC and control plane message exchange may be used for any of the following WTRU-WTRU communication purposes: a proximity-related inquiry from one WTRU to check on one or more partner-WTRUs to determine whether one or more of the proximity-based application(s) are available for invocation; the response may indicate the availability of the checked application and/or the application's access method and/or QoS requirement; and enabling a proximity-based application from an originating WTRU to invoke (include checking the consent of running that application) on one or more partner-WTRUs one of proximity-based application(s), where the application-name, application-Id, port number and/or the corresponding QoS requirement may be included, for example. The response to the RRC message may include the success or failure of the invocation and/or link parameters, for example.

According to an embodiment, when a new WTRU-to-WTRU link has been established between two partner WTRUs, the WTRU-to-network signaling messages, including control plane and user plane messages, may be transmitted over the new WTRU-to-WTRU link. This may be accomplished by mapping over the original WTRU-to-network link. In this case, the partner WTRUs may need to keep their original RRC connections and MME connections in case mobility related events happen or the proximity association dissolves and the WTRUs need to report the events and receive network commands.

In the case that the WTRU is not able to naturally keep the original link to the network (e.g. WTRU-to-WTRU in direct radio link), the WTRU and the network supporting proximity service may employ a time-division scheme such that the user plane communication between the two WTRUs may use X number of frames and then the control plane communication between the WTRU and the network may use Y number of frames, for example. The user plane and control plane communication may be scheduled one after another repeatedly in an interleave manner for a configured period of time.

According to an embodiment, for direct radio link communication between partner WTRUs, WTRU-to-WTRU direct data security may be used in place of or in addition to security encoders and decoders on both sides of the link (i.e. in the WTRU and in the network). Encoders and decoders may be on the communicating WTRUs in the direct communication, such that the transmitting WTRU encodes and the receiving WTRU decodes, and the network is not involved in the encoding/decoding.

According to an embodiment, the commanding MME may invoke security procedures, for example with the HSS and/or with the partner WTRUs, to derive and determine security keys and algorithms for the WTRU-WTRU direct communication. The commanding MME may pass on the security keys and the selection of the security algorithm to the partner WTRUs. The commanding MME may also inform the involved RAN node(s) (e.g. eNB) of the relevant security information. The WTRU-WTRU data security may be applied to the whole WTRU user plane communication, or it may be applied to the particular application on a specific bearer or channel, between the partner WTRUs under direct communication.

Paging and service request procedures may be designed to avoid resource setup. An example method may page a WTRU without setting up resources for the WTRU's EPS bearers, for example, if the system only desires to know the WTRU's location (e.g. the MME, due to a request from a proximity service or proximity application, only wants to know the WTRU's location). The WTRU may respond to paging which may cause the establishment of signal radio bearers but not data radio bearers and other resources for EPS bearers such as S1 resources. Herein, Paging for Location Identification (PLI) may refer to the paging of a WTRU to know its cell level location without the setup of user resources.

Any of the following mechanisms may be used as triggers for PLI at the MME. The MME may desire to know the WTRU's location. Accordingly, the MME may perform PLI due to any of the following when the WTRU is in idle mode: a request from a proximity server to locate the WTRU; a request from another WTRU that is a capable of public safety application or service; a request from an operator based proximity service; a request from any entity or node that requires to know the WTRU's location without needing to communicate user plane data with the WTRU; and a request from a public safety entity to know the location of a user and/or WTRU which may or may not be a user and/or WTRU with public safety capability.

Since the radio resources may not be required for PLI, the MME may inform the eNB about PLI so that resources will not be setup. Moreover, the eNB may use this indication to modify the paging message that is sent to the WTRU so that the WTRU knows that the lack of radio resource is intentional and is not an error case, and hence the WTRU may not attempt to re-attach. According to an embodiment, the MME may include an indication field in S1AP messages to inform the eNB that the paging is for PLI. This may be a dedicated IE or a new bit that may be added to any S1AP message, including for example the Paging message on the S1AP interface. This IE or new bit with a specific value may indicate that the paging is for PLI. Alternatively, a dedicated paging message may be defined, for example "Paging for Location Identification", on the S1AP interface.

Upon a reception of an indication field or message for PLI, the eNB may initiate a paging without setting up resources on the radio interface. According to another embodiment, the MME may include the indication in the Initial Context Setup Request message. The eNB may use this indication to abort the setup of radio resource or to not stop any radio resource.

According to an embodiment, an RRC Paging message may be modified to include an indication to inform the WTRU that the paging is for PLI and hence no radio resources will be setup. According to another embodiment, the RRC Connection Reconfiguration message may be modified to inform the WTRU that the paging is for PLI and hence no radio resources will be setup. In both exemplary embodiments, a new IE or bit may be added where a specific value may indicate paging for PLI. The eNB may use a dedicated message to send to the WTRU that may have the functionality of a paging message or an RRC Connection Reconfiguration message and include an indication of PLI.

Upon reception of an indication of PLI using any of the messages described above, the RRC may indicate any of the following information to the control plane layer: a paging for PLI has been received; and/or the WTRU is in connected mode for PLI, such that this this may be done after the WTRU and/or control plane responds to paging. Upon an indication about the receipt of paging for PLI, the WTRU or control plane entity may send a new control plane message as a response to paging for location identification. According to another embodiment, the WTRU or control plane entity may send a modified Service Request, an Extended Service Request message, or a service request procedure message and may include a indication (e.g. as a new IE or bit) to inform the MME that this is a response to paging for PLI and hence the network need not setup resources for in the user plane.

The WTRU and/or control plane entity may consider the service request procedure successful after the sending of this message, or after the lower layers acknowledge the successful transmission of the message to the eNB, or after an acknowledgment from the RRC that an RRC message (e.g. the RRC Connection Reconfiguration) with indication for PLI has been received.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer.

What is claimed is:

1. A method performed by a first wireless transmit/receive unit (WTRU) configured for proximity services with other WTRUs, the method comprising:

receiving, from an evolved Node B (eNB), an assignment of a proximity radio network terminal identifier (RNTI);

receiving, from the eNB, an indication of time intervals for direct wireless communication between the first WTRU and a second WTRU;

receiving, from the eNB, a first signal including control information for communication between the first WTRU and the eNB, wherein the first signal is derived at least in part from a cell RNTI (C-RNTI);

receiving, from the eNB, a second signal including control information for communication between the first WTRU and the second WTRU, wherein the second signal is derived at least in part from the proximity RNTI;

generating information intended for the second WTRU; and transmitting, based on the control information for communication between the first WTRU and the second WTRU, the information intended for the second WTRU to the second WTRU over a direct wireless connection between the first WTRU and the second WTRU in at least one of the indicated time intervals, wherein the information intended for the second WTRU is transmitted with a proximity source identification (ID) and a proximity destination ID.

2. The method of claim 1, wherein, the information intended for the second WTRU is a non-access stratum (NAS) message.

3. The method of claim 1 further comprising:
receiving an indication message indicating that the first WTRU may engage in direct WTRU-to-WTRU control plane communications with other WTRUs.

4. The method of claim 3, wherein the receiving the indication message is part of a registration procedure.

5. The method of claim 3, wherein the indication message is in a control plane.

6. The method of claim 1 further comprising:
discovering other WTRUs over a radio interface.

7. The method of claim 1 further comprising:
discovering other WTRUs over a control plane.

8. The method of claim 1, wherein the information intended for the second WTRU includes: a protocol discriminator field indicating whether a control plane protocol entity should process the information intended for the second WTRU.

9. The method of claim 1, wherein the information intended for the second WTRU includes: a message type field indicating the information intended for the second WTRU is for a WTRU-to-WTRU communication; a service type field indicating a type of service for the WTRU-to-WTRU communication; WTRU identifier fields indicating identities of at least the first WTRU and the second WTRU; an application identifier field indicating an application identity for the WTRU-to-WTRU communication; a session identifier field indicating a session identity for the WTRU-to-WTRU communication; and a message content field including application data to be exchanged between the first and second WTRUs.

10. The method of claim 1, further comprising:
transmitting a discovery signal over an air interface for use in discovering the first WTRU by the second WTRU prior to transmitting the information intended for the second WTRU to the second WTRU.

11. A method performed by a first wireless transmit/receive unit (WTRU) configured for proximity services with other WTRUs, the method comprising:

receiving, from an evolved Node B (eNB), an assignment of a proximity radio network terminal identifier (RNTI);

receiving, from the eNB, an indication of time intervals for direct wireless communication between the first WTRU and a second WTRU;

receiving, from the eNB, a first signal including control information for communication between the first WTRU and the eNB, wherein the first signal is derived at least in part from a cell RNTI (C-RNTI);

receiving, from the eNB, a second signal including control information for communication between the first WTRU and the second WTRU, wherein the second signal is derived at least in part from the proximity RNTI;

receiving, based on the control information for communication between the first WTRU and the second WTRU, a message from the second WTRU over a direct wireless connection between the first WTRU and the second WTRU in at least one of the indicated time intervals;

extracting information from at least one field in the third message, wherein the information includes a proximity source identification (ID), and a proximity destination ID;

providing the extracted information to at least one upper layer; and verifying a service type based on a service type field in the message.

12. A first wireless transmit/receive unit (WTRU) configured for proximity services with other WTRUs, the first WTRU comprising:

a transceiver configured to receive, from an evolved Node B (eNB), an assignment of a proximity radio network terminal identifier (RNTI);

the transceiver configured to receive, from the eNB, an indication of time intervals for direct wireless communication between the first WTRU and a second WTRU;

the transceiver configured to receive, from the eNB, a first signal including control information for communication between the first WTRU and the eNB, wherein the first signal is derived at least in part from a cell RNTI (C-RNTI);

the transceiver configured to receive, from the eNB, a second signal including control information for communication between the first WTRU and the second WTRU, wherein the second signal is derived at least in part from the proximity RNTI;

the transceiver configured to generate information intended for the second WTRU; and the transceiver configured to transmit, based on the control information for communication between the first WTRU and the second WTRU, the information intended for the second WTRU to the second WTRU over a direct wireless connection between the first WTRU and the second WTRU in at least one of the indicated time intervals, wherein the information intended for the second WTRU is transmitted with a proximity source identification (ID) and a proximity destination ID.

13. The first WTRU of claim 12, wherein the information intended for the second WTRU is a non-access stratum (NAS) message.

14. The first WTRU of claim 12, wherein:
the transceiver is further configured to receive an indication message indicating that the first WTRU may engage in direct WTRU-to-WTRU control plane communications with other WTRUs.

15. The first WTRU of claim 14, wherein the transceiver is further configured to receive the indication message as part of a registration procedure.

16. The first WTRU of claim 14, wherein the indication message is in a control plane.

17. The first WTRU of claim 12, wherein the transceiver is further configured to discover other WTRUs over a radio interface.

18. The first WTRU of claim 12, wherein the transceiver is further configured to discover other WTRUs over a control plane.

19. The first WTRU of claim 12, wherein the information intended for the second WTRU includes: a protocol discriminator field indicating whether a control plane protocol entity should process the information intended for the second WTRU.

20. The first WTRU of claim 12, wherein the information intended for the second WTRU includes: a message type field indicating the information intended for the second WTRU is for a WTRU-to-WTRU communication; a service type field indicating a type of service for the WTRU-to-WTRU communication; WTRU identifier fields indicating identities of at least the first WTRU and the second WTRU; an application identifier field indicating an application identity for the WTRU-to-WTRU communication; a session identifier field indicating a session identity for the WTRU-to-WTRU communication; and a message content field including application data to be exchanged between the first and second WTRUs.

21. The first WTRU of claim 12, wherein:
the transceiver is further configured to transmit a discovery signal over an air interface for use in discovering the first WTRU by the second WTRU prior to transmitting the information intended for the second WTRU to the second WTRU.

* * * * *